United States Patent
Fujishima et al.

(10) Patent No.: US 11,217,855 B2
(45) Date of Patent: Jan. 4, 2022

(54) CELL PACK AND METHOD FOR PRODUCING AND METHOD FOR DISASSEMBLING THE SAME

(71) Applicant: TOYOTA JIDOSHA KABUSHIKI KAISHA, Toyota (JP)

(72) Inventors: Seigo Fujishima, Miyoshi (JP); Masayuki Kitaura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/239,424

(22) Filed: Apr. 23, 2021

(65) Prior Publication Data
US 2021/0328295 A1 Oct. 21, 2021

Related U.S. Application Data

(62) Division of application No. 16/220,286, filed on Dec. 14, 2018.

(30) Foreign Application Priority Data

Jan. 12, 2018 (JP) .............................. JP2018-003872

(51) Int. Cl.
*H01M 50/20* (2021.01)
*H01M 10/04* (2006.01)
*H01M 50/264* (2021.01)
*H01M 50/233* (2021.01)
*H01M 50/211* (2021.01)
(Continued)

(52) U.S. Cl.
CPC ....... *H01M 50/20* (2021.01); *H01M 10/0481* (2013.01); *H01M 50/211* (2021.01); *H01M 50/233* (2021.01); *H01M 50/264* (2021.01); *H01M 10/0525* (2013.01); *H01M 10/0562* (2013.01); *H01M 10/0565* (2013.01)

(58) Field of Classification Search
None
See application file for complete search history.

(56) References Cited

U.S. PATENT DOCUMENTS

| 5,766,801 A | 6/1998 | Inoue et al. |
| 2011/0151312 A1 | 6/2011 | Kim |

(Continued)

FOREIGN PATENT DOCUMENTS

| CN | 203300728 U | 11/2013 |
| DE | 10 2015 225 351 A1 | 6/2017 |

(Continued)

*Primary Examiner* — Eugenia Wang
(74) *Attorney, Agent, or Firm* — Dickinson Wright, PLLC

(57) ABSTRACT

A cell pack includes a plurality of unit cells arranged in an arrangement direction and a restraint mechanism for restraining these unit cells. The restraint mechanism includes: a first end plate portion disposed at an end portion in a first direction of the arrangement direction of the plurality of unit cells; a second end plate portion disposed at an end portion in a second direction of the arrangement direction of the plurality of unit cells; and a ring-shaped restraining hoop portion. A dimension in the arrangement direction between the first end plate portion and the second end plate portion of the restraining hoop portion is set such that a predetermined restraining pressure is applied in a direction of compressing the plurality of unit cells along the arrangement direction. A method for disassembling the cell pack is also provided.

2 Claims, 13 Drawing Sheets

(51) Int. Cl.
*H01M 10/0565* (2010.01)
*H01M 10/0525* (2010.01)
*H01M 10/0562* (2010.01)

(56) References Cited

U.S. PATENT DOCUMENTS

| | | |
|---|---|---|
| 2015/0134172 A1 | 5/2015 | Ose et al. |
| 2016/0204400 A1 | 7/2016 | Baek et al. |
| 2018/0083239 A1 | 3/2018 | Subramanian et al. |
| 2018/0287232 A1 | 10/2018 | Koegel et al. |
| 2018/0294503 A1 | 10/2018 | Hoefler et al. |
| 2019/0013501 A1 | 1/2019 | Sakurai |

FOREIGN PATENT DOCUMENTS

| | | |
|---|---|---|
| JP | 09-120808 A | 5/1997 |
| JP | 2002-343324 A | 11/2002 |
| JP | 2011134699 A | 7/2011 |
| JP | 2013-020740 A | 1/2013 |
| JP | 2013051048 A | 3/2013 |
| JP | 2013530506 A | 7/2013 |
| JP | 2015049991 A | 3/2015 |
| JP | 2015-187913 A | 10/2015 |
| JP | 2016157586 A | 9/2016 |
| JP | 2018029017 A | 2/2018 |
| WO | 2012/009145 A2 | 1/2012 |
| WO | 2012009145 A2 | 1/2012 |
| WO | 2017/102166 A1 | 6/2017 |
| WO | 2017102166 A1 | 6/2017 |

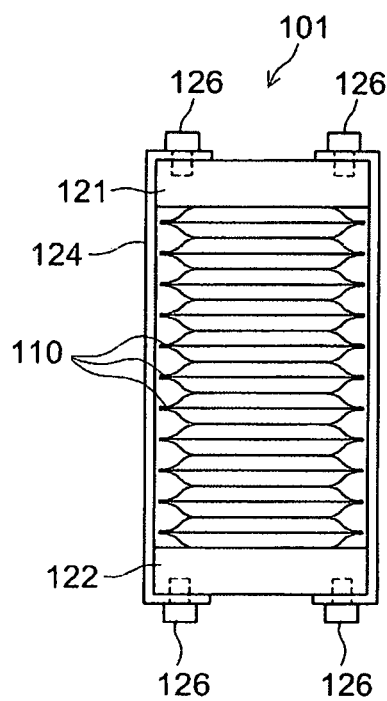
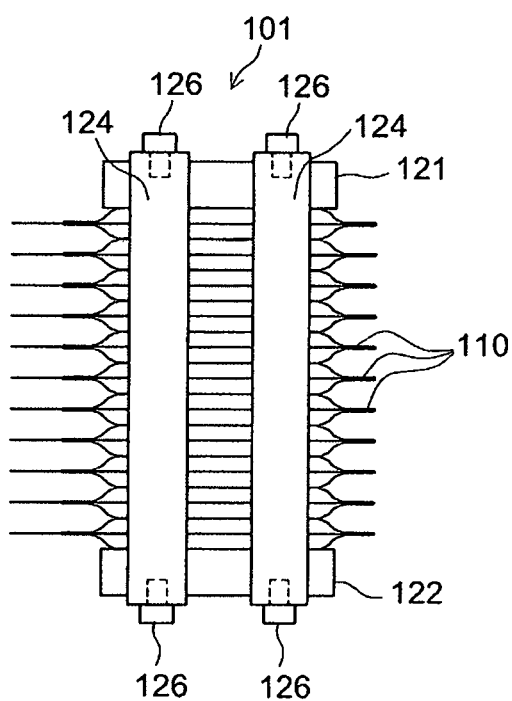
FIG.13A
FIG.13B

CELL PACK AND METHOD FOR PRODUCING AND METHOD FOR DISASSEMBLING THE SAME

CROSS REFERENCE TO RELATED APPLICATIONS

This application is a divisional of U.S. application Ser. No. 16/220,286, filed Dec. 14, 2018, which claims priority based on Japanese Patent Application No. 2018-003872 filed on Jan. 12, 2018, the entire contents of which are incorporated herein by reference.

BACKGROUND

The present disclosure relates to a cell pack in which a plurality of secondary cells is arranged and bundled, and a method for producing and a method for disassembling the same.

In recent years, secondary cells such as lithium ion cells have become indispensable as portable power sources for personal computers, portable terminals and the like and also power sources for driving vehicles such as electric vehicles (EV), hybrid vehicles (HV), and plug-in hybrid vehicles (PHV) and power sources for power storage and the like. Further, for example, as disclosed in Japanese Patent Application Publication No. H09-120808, Japanese Patent Application Publication No. 2013-020740, Japanese Patent Application Publication No. 2015-187913, and Japanese Patent Application Publication No. 2002-343324, cells for applications requiring a large capacity or high output are generally configured in the form of cell packs in which a plurality of unit cells (battery cells) is stacked in a predetermined arrangement direction and bundled in order to connect the plurality of unit cells efficiently in parallel or in series. Japanese Patent Application Publication No. H09-120808 discloses a cell pack in which both ends of a cell stack are sandwiched between a pair of end plates, a restraining band is passed over the end plates, and the restraining band is fixed to the end plates with a fastener.

In the cell pack, in order to prevent displacement of the unit cells due to vibration, shock, or the like during use of the cells and to ensure cell characteristics, cell life and the like, restraining is sometimes performed by applying a load in a direction of compressing which is perpendicular to the electrode surface of the unit cells. It is also known that secondary cells repeatedly undergo volumetric expansion and contraction in the course of charging and discharging. For this reason, a stress may be generated in the tensile direction from the cell stack to the end plates. In a configuration in which the end plates and the restraining band are restrained by a fastener, such a load easily concentrates on the fastener or the like, and the fastening member may be plastically deformed or broken. When the fastening member is plastically deformed or broken, the restraint of the single cells is loosened, and it becomes impossible to maintain the restraining pressure necessary for the unit cells.

SUMMARY

The present disclosure has been made in view of the above circumstances, and it is an object of the present disclosure to provide a cell pack having a restraint mechanism which is unlikely to be loosened or broken even when a restraining pressure is applied which is higher than, for example, in the related art, and also to provide a method for producing and a method for disassembling the cell pack.

The cell pack disclosed herein includes a plurality of unit cells (hereinafter may be referred to as "cell stack") arranged in an arrangement direction and a restraint mechanism for restraining the plurality of unit cells. The restraint mechanism includes a first end plate portion disposed at an end portion in a first direction of the arrangement direction of the plurality of unit cells, a second end plate portion disposed at an end portion in a second direction of the arrangement direction of the plurality of unit cells, and a ring-shaped restraining hoop portion including a first support portion disposed on a surface of the first end plate portion in the first direction, a second support portion disposed on a surface of the second end plate portion in the second direction, and a pair of side wall portions continuously connecting the first support portion and the second support portion along the arrangement direction. A dimension in the arrangement direction between the first end plate portion and the second end plate portion of the restraining hoop portion is set such that a predetermined restraining pressure is applied in a direction of compressing the plurality of unit cells along the arrangement direction.

According to the above configuration, the restraint mechanism restrains the cell stack in the arrangement direction by the ring-shaped restraining hoop portion. The restraining hoop portion has a ring shape closed in the longitudinal direction. Further, the pair of end plate portions is arranged inside the ring of the restraining hoop portion. Therefore, the reaction force of the cell stack against the restraining pressure does not cause the end plate portion to be disengaged from the restraining hoop portion. As a result, it is unnecessary to fix the restraining hoop portion and the pair of end plate portions locally by a fastener as in the related art. Further, for example, since there is no need to hang the restraining hoop portion on the end plate portions, the corners of the end portions in the end plate portions that are in contact with the restraining hoop portion can be curved. Thus, it is possible to eliminate the locations where the stress concentrates in the restraint mechanism, and the loosening and breakage of the restraint mechanism are suppressed. For example, even when the cell pack is used in an environment where vibrations occur, or when the cell pack is restrained with a restraining pressure higher than that in the related art, it is possible to stably maintain a high restraining pressure for a long time. In addition, highly stable cell performance in the cell stack can be maintained over a long period of time.

In a preferred embodiment of the cell pack disclosed herein, the restraint mechanism includes two or more restraining hoops. In another preferred embodiment, the unit cell includes a power generating element including a positive electrode and a negative electrode, the restraint mechanism includes only one restraining hoop portion, and a dimension of the restraining hoop portion in a hoop width direction perpendicular to a surface forming the ring is equal to or greater than ½ of a dimension of the power generating element in the hoop width direction. With such a configuration, the tensile strength of the restraining hoop portion in the entire arrangement direction can be increased. As a result, it is possible to stably restrain the cell stack with a higher restraining pressure.

In a preferred embodiment of the cell pack disclosed herein, the restraining hoop portion is a seamless ring. Where the restraining hoop portion is formed in a ring shape including a seam, tensile stress sometimes tends to concentrate in the seam. Also, the seam tends to have lower strength against tensile stress than other parts. Therefore, by using such a configuration, it is possible to increase the tensile strength of the restraining hoop portions in the arrangement direction. Further, with such a configuration, it is possible to stably restrain the cell stack with a higher restraining pressure.

In a preferred embodiment of the cell pack disclosed herein, the restraint mechanism is formed by integrally molding the first end plate portion, the second end plate portion, and the restraining hoop portion with a single material. By integrally molding the restraint mechanism, it is possible to reduce the number of parts and realize a restraint mechanism with good handleability. Further, for example, by increasing the width of the restraining hoop portion to match the dimension of the end plate portion, the restraining load can be dispersed and held in a wider area, and a higher restraining pressure can be applied to the cell stack.

In a preferred embodiment of the cell pack disclosed herein, a sliding plate is interposed between the first end plate portion and the plurality of unit cells and between the second end plate portion and the plurality of unit cells, the sliding plate including a sliding surface having a coefficient of friction of 0.5 or less on a surface in contact with the first end plate portion or the second end plate portion. With such a configuration, it is possible to easily arrange the cell stack between the pair of end plate portions. The advantageous result is that it is possible to reduce the load applied to the cell stack at the time of production.

In a preferred embodiment of the cell pack disclosed herein, the unit cell includes a power generating element including a positive electrode and a negative electrode, and the negative electrode includes a metal material that forms an alloy with lithium as a negative electrode active material. As described above, the restraint mechanism disclosed herein can restrain the cell stack with a higher restraining pressure than in the related art. Therefore, it is particularly preferable to use such a configuration, for example, for a cell pack including, as a unit cell, a cell using a negative electrode active material of a metal material type which repeatedly undergoes large volumetric expansion and shrinkage during charging and discharging.

In a preferred embodiment of the cell pack disclosed herein, the unit cell is an all-solid state cell including a positive electrode, a negative electrode, and a solid electrolyte. As indicated hereinabove, the restraint mechanism disclosed herein can restrain the cell stack with a higher restraining pressure than in the related art. For this reason, it is particularly preferable to use such a configuration, for example, for a cell pack including, as a unit cell, an all-solid state cell that does not contain an electrolytic solution and has an increased internal resistance due to the interface resistance of the constituent materials of the power generating element.

In another aspect, the technique disclosed herein provides a method for producing a cell pack. The production method includes arranging a plurality of unit cells in an arrangement direction to prepare a first cell stack; arranging a first end plate portion and a second end plate portion so that the end plate portions are separated along the arrangement direction, and disposing a ring-shaped restraining hoop portion so as to surround the first end plate portion and the second end plate portion on planes parallel to the arrangement direction; displacing the first end plate portion in a third direction on a side opposite to the second end plate portion in the arrangement direction so that a separation distance between the first end plate portion and the second end plate portion is equal to or larger than a dimension of the first cell stack in the arrangement direction, and stretching the restraining hoop portion; inserting the first cell stack, such that the arrangement direction is the third direction, between the displaced first end plate portion and the second end plate portion; and releasing the displacement of the first end plate portion and restraining the plurality of unit cells while applying a load in a direction of compressing along the arrangement direction to the plurality of unit cells by the first end plate portion, the second end plate portion and the restraining hoop portion. With such a method, the restraint mechanism including the ring-shaped restraining hoop portion can be easily installed at the cell stack.

In yet another aspect, the technique disclosed herein provides a method for producing a cell pack. The production method includes arranging a plurality of unit cells in an arrangement direction, disposing a first sliding plate at an end portion of the plurality of unit cells in a first direction of the arrangement direction, and disposing a second sliding portion at an end portion of the plurality of unit cells in a second direction of the arrangement direction to prepare a second cell stack; compressing the second cell stack in the arrangement direction so that a dimension thereof in the arrangement direction becomes a first dimension; preparing a restraint mechanism which includes a first end plate portion, a second end plate portion, and a ring-shaped restraining hoop portion and in which the first end plate portion and the second end plate portion are disposed opposite each other and spaced apart by a first dimension along the arrangement direction and, in a plane parallel to the arrangement direction, the restraining hoop portion is disposed so as to surround the first end plate portion and the second end plate portion along the outer periphery thereof; installing an expansion suppressing jig that prevents a separation distance between the first end plate portion and the second end plate portion from spreading beyond the first dimension; inserting the compressed second cell stack between the first end plate portion and the second end plate portion; and restraining the plurality of unit cells while displacing the expansion suppressing jig in a direction in which the separation distance in the arrangement direction is increased and applying a load with the restraining mechanism to the plurality of unit cells in a direction of compressing along the arrangement direction. With such a configuration, the restraint mechanism including the ring-shaped restraining hoop portion can be easily installed at the cell stack.

The technique disclosed herein provides a method for disassembling a cell pack including a first cell stack in which a plurality of unit cells is arranged in an arrangement direction and a restraint mechanism for restraining the plurality of unit cells. The restraint mechanism includes a first end plate portion disposed at an end portion in a first direction of the arrangement direction of the first cell stack; a second end plate portion disposed at an end portion in a second direction of the arrangement direction of the first cell stack; and a ring-shaped restraining hoop portion including a first support portion disposed on a surface of the first end plate portion in the first direction, a second support portion disposed on a surface of the second end plate portion in the second direction, and a pair of side wall portions continuously connecting the first support portion and the second support portion along the arrangement direction. The method for disassembling includes: displacing the first end plate portion relative to the second end plate portion in the first direction so as to extend the restraining hoop portion along the arrangement direction; taking out the first cell stack from between the first end plate portion and the second end plate portion; and displacing the displaced first end plate portion relative to the second end plate portion in the second direction to release the extension of the restraining hoop portion. With such a method, it is possible to disassemble the cell pack having the ring-shaped restraining hoop portion safely and easily.

In yet another aspect, the technique disclosed herein provides a method for disassembling a cell pack including a second cell stack in which a plurality of unit cells is arranged in an arrangement direction, a first sliding plate is disposed at an end portion in a first direction of the arrangement direction of the plurality of unit cells, and a second sliding plate is disposed at an end portion in a second direction of the arrangement direction of the plurality of unit cells; and a restraint mechanism for restraining the second cell stack. The restraint mechanism includes: a first end plate portion disposed at the end portion in the first direction of the arrangement direction of the second cell stack; a second end plate portion disposed at the end portion in the second direction of the arrangement direction of the second cell stack; and a ring-shaped restraining hoop portion including a first support portion disposed on a surface of the first end plate portion in the first direction, a second support portion disposed on a surface of the second end plate portion in the second direction, and a pair of side wall portions continuously connecting the first support portion and the second support portion along the arrangement direction. The method for disassembling includes: compressing the cell pack in the arrangement direction so that the dimension of the second cell stack in the arrangement direction becomes a second dimension; preparing a pressure release area with a dimension in the arrangement direction equal to the second dimension at a position adjacent to the compressed second cell stack in a direction perpendicular to the arrangement direction of the compressed cell pack; pressing the first sliding plate and the second sliding plate of the compressed second cell stack in a direction perpendicular to the arrangement direction toward the pressure release area, and moving the second cell stack from a space between the first end plate portion and the second end plate portion to the pressure release area; and releasing the compression of the compressed second cell stack by enlarging the dimension of the pressure release area in the arrangement direction with respect to the second dimension. With such a configuration, it is possible to disassemble the cell pack having the ring-shaped restraining hoop portion safely and easily without extending the restraining hoop portion.

BRIEF DESCRIPTION OF THE DRAWINGS

FIGS. 13A and 13B are respectively a side view and a front view schematically illustrating a conventional cell pack.

DETAILED DESCRIPTION OF THE PREFERRED EMBODIMENTS

Figure 1:
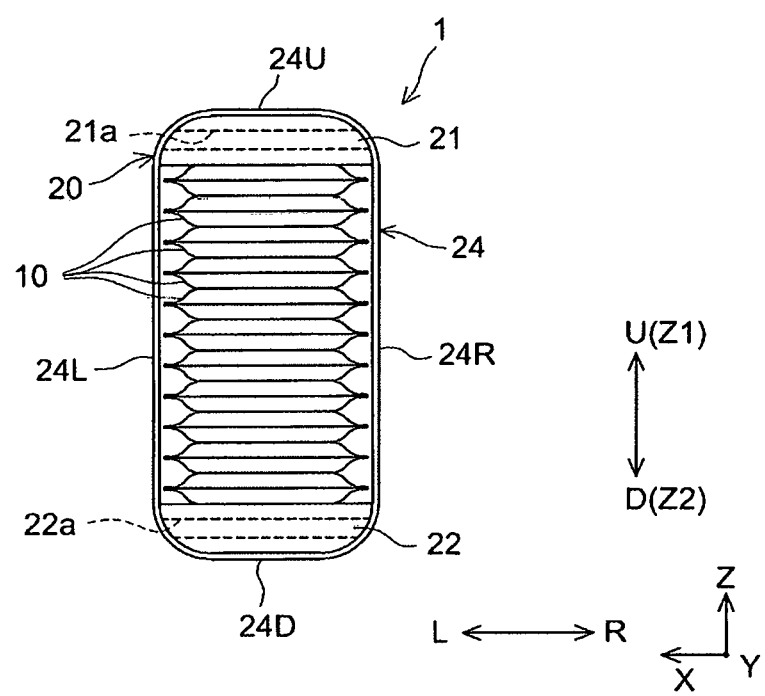
FIG. 1 is a front view schematically illustrating a cell pack according to one embodiment.

Hereinafter, embodiments of the present disclosure will be described. Incidentally, matters other than those particularly mentioned in the present specification and necessary for the implementation of the present disclosure (for example, the configuration of a unit cell not characterizing the present disclosure) are based on the related art in the pertinent field and can be understood as design matters for a person skilled in the art. The present disclosure can be carried out based on the contents disclosed in this specification and technical common sense in the field. In the specification, the numerical range expressed as "A to B" means "A or more and B or less".

In addition, in the following drawings, the same reference numerals are attached to members and parts that exhibit the same action. In the drawings, reference symbols U, D, F, Rr, L, R respectively mean upward, downward, forward, rearward, leftward, and rightward. Reference symbols X, Y, and Z in the drawings respectively denote a width direction, a longitudinal direction, and an arrangement direction of unit cells, Z1 denotes a first direction in the arrangement direction Z, and Z2 denotes a second direction, which is opposite to the first direction Z1, in the arrangement direction Z. However, these are merely for convenience of explanation, and do not limit the installation, use mode, method for producing, method for disassembling and the like of the cell pack at all.

First Embodiment

Battery Pack

Figure 2:
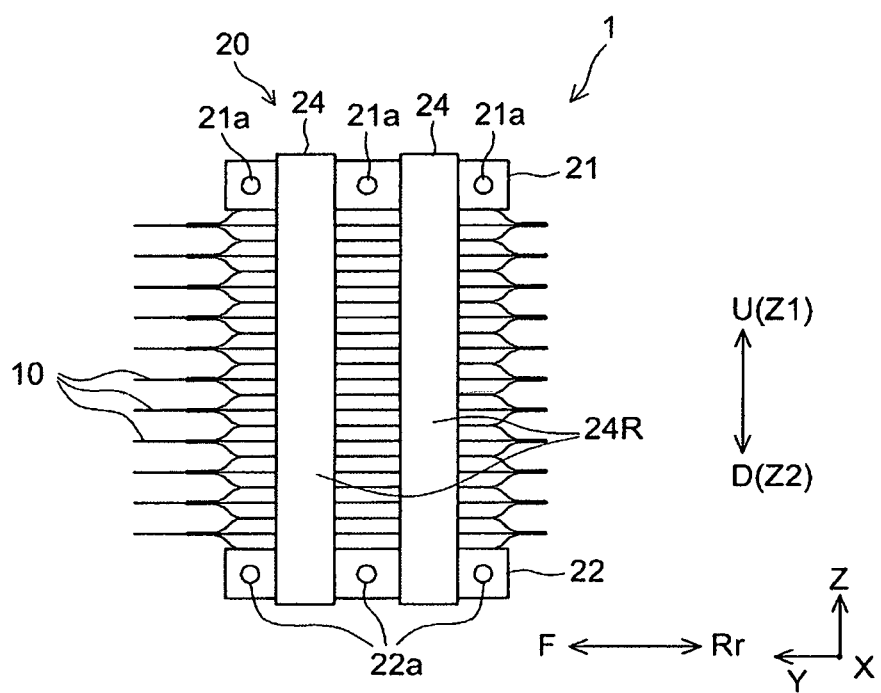
FIG. 2 is a side view schematically illustrating the cell pack of FIG. 1.

FIG. 1 is a front view schematically illustrating a cell pack 1 according to one embodiment, and FIG. 2 is a side view thereof. The cell pack 1 includes a plurality of unit cells 10 and a restraint mechanism 20. The plurality of unit cells 10 are arranged in the predetermined arrangement direction Z. The restraint mechanism 20 is a member for restraining these unit cells 10 so that they can be treated as a cell pack. Each element will be described below.

Unit Cell

Figure 3:
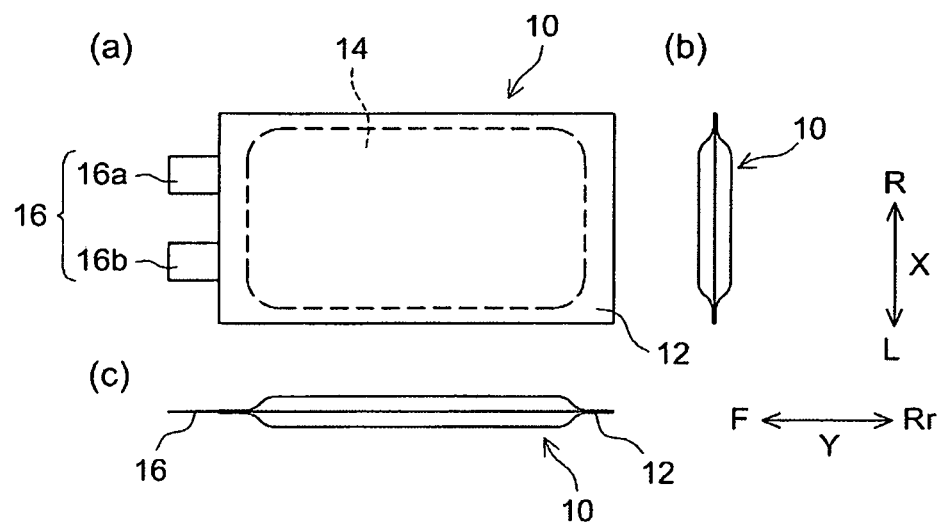
FIG. 3 is a three-view diagram consisting of a plan view (a), a front view (b), and a side view (c) schematically illustrating a unit cell according to one embodiment.

FIG. 3 is three-view diagrams consisting of a plan view (a), a front view (b), and a side view (c) schematically illustrating the unit cell 10. The unit cell 10 is typically a secondary cell that can be repeatedly charged and discharged, for example, a lithium ion secondary cell, a nickel metal hydride cell, an electric double layer capacitor, or the like. All-solid cells using a solid electrolyte composed of ceramics, ion conductive polymers or the like and using no flammable electrolytic solution as an electrolyte have been put to practical use in order to improve safety of secondary cells. Hereinafter, the configuration where the unit cell 10 is an all-solid lithium ion secondary cell will be described as an example, but the configuration of the unit cell 10 is not limited thereto. The unit cell 10 typically includes a power generating element 14 including a positive electrode, a negative electrode, and a solid electrolyte (not shown) and a cell case 12. One unit cell 10 may have only one power generating element 14 or two or more power generating elements. In this regard, the term "unit cell" as used in the present specification is a "battery module" defined in HS D 0114:2000, and the term "power generating element" as used in the present specification means "unit cell" as defined in the same standard. The power generating element 14 is accommodated in the cell case 12.

In the all-solid state cell, the power generating element 14 is configured by arranging the solid electrolyte in a layer form between a positive electrode active material layer and a negative electrode active material layer. The solid electrolyte layer and the positive and negative active material layers may be formed as a dense bulk body by, for example, a CVD method, or by binding a powdery (particulate) electrode constituting materials with a binder. Since an electrolytic solution is not present in the all-solid state cell, the interfacial resistance between the solid electrolyte layer and the positive and negative active material layers is higher than in a liquid-type secondary cell including the electrolytic solution. In addition, the interface resistance also occurs between particles constituting the solid electrolyte layer and the positive and negative active material layers in an all-solid state cell produced using a powder material. Therefore, for cell packs made of all-solid state cells, it is required to apply a restraining pressure as high as about 5 to 10 times that of cell packs of liquid type secondary cells for the purpose of reducing the interfacial resistance. As will be described hereinbelow, in the cell pack 1 disclosed herein, the unit cells 10 can be restrained by confining a higher restraining pressure than in the related art. Therefore, a power generating element formed using powdery electrode constituent material which requires the application of a higher restraining pressure can be suitably used as the power generating element 14.

The solid electrolyte layer mainly includes a solid electrolyte material. As the solid electrolyte material, for example, various compounds which have lithium ion conductivity but do not exhibit electron conductivity can be suitably used. Specific examples of such a solid electrolyte materials include amorphous sulfides such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, $LiI$—$Li_3PS_4$—$LiBr$, $Li_2S$—$P_2S_5$, $Li_2S$—$P_2S_5$—$LiI$—$LiBr$, and $Li_2S$—$P_2S_5GeS_2$ and the like, amorphous oxides such as $Li_2O$—$B_2O_3$—$P_2O_5$, $Li_2O$—$SiO_2$, $Li_2O$—$B_2O_3$, $Li_2O$—$B_2O_3$—$ZnO$ and the like, crystalline sulfides such as $Li_{10}GeP_2S_{12}$ and the like, crystalline oxides such as $Li_{1.3}Al_{0.3}Ti_{0.7}(PO_4)_3$, $Li_{1+x+y}A^1_xTi_{2-x}Si_yP_{3-y}O_{12}$ ($A^1$ is Al or Ga, $0 \leq x \leq 0.4$, $0 < y \leq 0.6$), $[(A^2_{1/2}Li_{1/2})_{1-z}C_z]TiO_3$ ($A^2$ is La, Pr, Nd, or Sm, C is Sr or Ba, $0 \leq z \leq 0.5$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$ and the like, crystalline oxynitrides such as $Li_3PO_{(4-3/2w)}N_w$ ($w<1$) and the like, crystalline nitrides such as $Li_3N$ and the like, and crystalline iodide such as $LiI$, $LiI$—$Al_2O_3$, $Li_3N$—$LiI$—$LiOH$ and the like. Among them, amorphous sulfides can be preferably used from the viewpoint of having excellent lithium ion conductivity.

A semi-solid polymer electrolyte such as polyethylene oxide, polypropylene oxide, polyvinylidene fluoride, or polyacrylonitrile including a lithium salt can also be used as a solid electrolyte.

Further, in the present specification, the expression "mainly includes" means that the component is included at 50% by mass or more, preferably 60% by mass or more, more preferably 70% by mass or more, for example, at 80% by mass or more.

The positive electrode active material layer mainly includes a positive electrode active material. The negative electrode active material layer mainly includes a negative electrode active material. As the positive electrode active material and the negative electrode active material, various materials usable as electrode active materials for all-solid state cells can be used. For example, various compounds capable of occluding/releasing lithium ions can be suitably used. There is no specific limitation on the positive electrode active material and the negative electrode active material. For example, where the charging/discharging potentials of two kinds of active materials are compared, a material exhibiting a relatively noble charge/discharge potential can be used for the positive electrode, and a material exhibiting a low potential can be used for the negative electrode.

Examples of such active materials include lithium transition metal oxides of a layered rock salt type such as a lithium cobalt oxide (for example, $LiCoO_2$), a lithium nickel oxide (for example, $LiNiO_2$), $Li_{1+x}Co_{1/3}Ni_{1/3}Mn_{1/3}O_2$ (x satisfies $0 \leq x < 1$) and the like, spinel-type lithium transition metal oxides such as lithium manganese oxide (for example, $LiMn_2O_4$), Li—Mn spinets substituted with different elements and having the composition represented by $LI_{1+x}Mn_{2-x-y}M^1_yO_4$ ($M^1$ is at least one metal element selected from the group consisting of Al, Mg, Ti, Co, Fe, Ni, and Zn; and x and y independently satisfy $0 \leq x$, $y \leq 1$) and the like, oxides such as lithium titanium oxide (for example, $Li_xTiO_y$, x and y independently satisfy $0 \leq x$, $y \leq 1$), metallic lithium phosphate (for example, $LiM^2PO_4$, $M^2$ is Fe, Mn, Co, or Ni), vanadium oxide (for example $V_2O_5$), molybdenum oxide (for example $MoO_3$) and the like, titanium sulfide (for example, $TiS_2$), carbon materials such as graphite, hard carbon and the like, lithium cobalt nitride (for example, LiCoN), lithium silicon oxide (for example, $Li_xSi_yO_z$, x, y, z independently satisfy $0 \leq x$, y, $z \leq 1$), lithium metal (Li), silicon (Si) and tin (Sn) and oxides thereof (for example, SiO, $SnO_2$), lithium alloys (for example, $LiM^3$, where $M^3$ is C, Sn, Si, Al, Ge, Sb, Pb or P), intermetallic compounds capable of storing lithium (for example, $Mg_xM^4$ and $M^5_ySb$, $M^4$ is Sn, Ge, or Sb, $M^5$ is In, Cu, or Mn), and derivatives and complexes thereof.

The electrode active material can undergo volume expansion/contraction as lithium ions are occluded/released. Here, the active material layer made of a material having a large volume change rate due to occlusion/release of lithium ions is likely to crack and peel off, and the interface resistance is likely to increase. Meanwhile, since the cell pack 1 disclosed herein can be configured by confining a restraining pressure higher than that in the related art, as mentioned hereinabove, the increase in interfacial resistance caused by cracking or peeling of the active material layer or the like can be suitably suppressed. From such a viewpoint, according to the technique disclosed herein, even a material having a large volume expansion coefficient can be advantageously used as the electrode active material. As such an electrode active material, for example, a carbon material or a metal material that forms an alloy with lithium can be mentioned. Among them, metal materials such as silicon and silicon alloys, lithium and lithium alloys, tin and tin alloys and the like having a high theoretical capacity can be advantageously used as the negative electrode active material.

In addition, in order to enhance the lithium ion conductivity in the positive and negative active material layers, a part of the active material may be replaced with the above-mentioned solid electrolyte material. In this case, the proportion of the solid electrolyte material to be contained in the active material layer can be, for example, 60% by mass or less, preferably 50% by mass or less, and even more preferably 40% by mass or less when the total content of the active material and the solid electrolyte material is 100% by mass. Further, the proportion of the solid electrolyte material at the time of replacement is suitably 10% by mass or more, preferably 20% by mass or more, and more preferably 30% by mass or more. When performing such a replacement of the active material with the solid electrolyte material, the positive and negative material layers can be mainly composed of the active material and the solid electrolyte material.

When a solid electrolyte composed of a sulfide is included in a positive electrode active material layer having a higher potential, a reaction layer with a high resistance is formed at the interface between the positive electrode active material and the solid electrolyte, and there is a possibility of a high interface resistance. Therefore, in order to suppress such an event, the positive electrode active material particles can be coated with a crystalline oxide having lithium ion conductivity. The lithium ion conductive oxide for coating the positive electrode active material can be exemplified by an oxide represented by the general formula $LixA^3Oy$. In the formula, $A^3$ is B, C, Al, Si, P, S, Ti, Zr, Nb, Mo, Ta or W, and x and y are positive numbers. Specific examples of the lithium ion conductive oxide include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, $Li_2WO_4$ and the like. Further, the lithium ion conductive oxide may be a composite oxide composed of any combination of the above lithium ion conductive oxides, such as $Li_4SiO_4$—$Li_3BO_3$, $Li_4SiO_4$—$Li_3PO_4$ and the like.

When the surface of the positive electrode active material particles is coated with the ion conductive oxide, at least a part of the positive electrode active material or the entire surface of the positive electrode active material particles may be coated with the ion conductive oxide. The thickness of the ion conductive oxide coating the positive electrode active material particles is preferably, for example, 0.1 nm or more, and more preferably 1 nm or more. Further, the thickness of the ion conductive oxide is preferably, for example, 100 nm or less, and more preferably 20 nm or less. The thickness of the ion conductive oxide can be measured, for example, using an electron microscope such as a transmission electron microscope (TEM).

The positive and negative active material layers may include, as necessary, a conductive material for enhancing the electron conductivity. Examples of the conductive material include, but are not specifically limited to, graphite, carbon black such as acetylene black (AB), Ketjen black (KB) and the like, vapor grown carbon fibers (VGCF), carbon nanotubes, carbon nanofibers, and other carbon materials can be suitably used. Such a conductive material may be included, for example, at 1% by mass or more, in the range of 1% by mass to 12% by mass, preferably 2% by mass to 10% by mass, based on 100% by mass of the total amount of the electrode active material layer.

When the power generating element 14 is formed using a powdery electrode constituent material, the average particle diameter ($D_{50}$) thereof is not particularly limited, and for example, it is preferable to use the following size. That is, when the solid electrolyte layer is made of a powder material, the average particle diameter is, for example, about 0.1 μm or more, preferably 0.4 μm or more. Further, the average particle diameter of the solid electrolyte material can be, for example, 50 μm or less, preferably 5 μm or less. When the electrode active material layer is made of a powder material, the average particle diameter is, for example, 0.1 μm or more, and may be 0.5 μm or more. Meanwhile, the average particle diameter is, for example, 50 μm or less and may be 5 μm or less. When the powder material is processed into the form of granulated powder, the average particle diameter as the diameter of primary particles is preferably within the above range.

In this specification, the average particle diameter is a particle diameter corresponding to cumulative 50% in the volume-based particle size distribution measured using a laser diffraction-light scattering type particle size distribution meter. For finer powders having an average particle diameter of 1 μm or less, measured values by the dynamic light scattering (DLS) method may be used.

There is also no particular limitation on the binder for binding the powdery electrode constituent material. For example, various organic compounds having binding properties can be used. Examples of such binders include polytetrafluoroethylene, polytrifluoroethylene, polyethylene, cellulose resin, acrylic resin, vinyl resin, nitrile rubber, polybutadiene rubber, butyl rubber, polystyrene, styrene butadiene rubber, styrene butadiene latex, polysulfide rubber, acrylonitrile butadiene rubber, polyvinyl fluoride, polyvinylidene fluoride (PVDF), fluororubber, and the like. Any one of the above-mentioned binders may be used singly, or two or more binders may be used in combination as the binder.

The power generating element 14 is provided with a current collector, so that electric power can be taken out to an external load. The shape of the current collector is not particularly limited, and examples of suitable shape include a foil, a plate, a mesh or the like. Further, for example, an active material layer may be provided on the surface (one side or both sides) of the current collector. Various materials which are excellent in electron conductivity and are unlikely to be modified by the charge/discharge potential of the active material to be used are suitable as such collectors. Examples of the current collector material include aluminum, copper, nickel, iron, titanium, alloys thereof (for example, an aluminum alloy, stainless steel), carbon and the like. The thickness of the current collector is not particularly limited, because it depends on the size of the electrode body and the like, and is preferably 5 μm or more and 500 μm or less, and more preferably 10 μm or more and 100 μm or less.

When the unit cell 10 includes only one power generating element 14, for example, the active material layer may be provided on one side of the current collector. In this case, the power generating element 14 can be constructed, for example, by laminating a positive electrode having a positive electrode active material layer on one side of a positive electrode current collector and a negative electrode having a negative electrode active material layer on one side of a negative electrode current collector, with a solid electrolyte layer interposed therebetween, with orientation such that the active material layers face each other. When the unit cell 10 includes two or more power generating elements 14, for example, an active material layer may be provided on both surfaces of the current collector. In this case, for example, a plurality of power generating elements 14 can be constructed by preparing a plurality of positive electrodes having positive electrode active material layers on both surfaces of a positive electrode current collector and a plurality of negative electrodes having negative electrode active material layers on both surfaces of a negative electrode current collector and alternately laminating the positive electrodes and the negative electrodes so that the positive and negative active material layers are insulated from each other by a solid electrolyte layer.

The interface resistance between the solid electrolyte layer and the positive and negative active material layers is increased because no electrolytic solution is present in the all-solid state cell. In addition, for example, in an all-solid state cell produced using a powdery material, interfacial resistance is increased by interfaces between particles, voids and the like also in the solid electrolyte layer and positive and negative active material layers. An effective method of reducing such interfacial resistance is to increase the packing density by applying pressure in the direction of compressing the power generating element 14, in which the positive electrode active material layer, the solid electrolyte layer and the negative electrode active material layer are laminated, along the lamination direction thereof and reducing the voids between the layers and inside the layers.

Accordingly, in the present embodiment, the cell case 12 is configured of a soft metal laminated film. The cell case 12 is an exterior material for housing the power generating element 14. The metal laminated film is configured by bonding a lightweight relatively soft metal foil such as aluminum or copper and an insulating thermoplastic resin sheet such as polypropylene (PP), and has a high degree of freedom of deformation. Therefore, with the cell case 12 composed of the metal laminated film, the restraining pressure created by the restraint mechanism 20 can be effectively applied to the power generating element 14, as compared with the configuration where a cell case made of a metal can is used. In addition, by configuring the cell case 12 of a metal laminated film, it is possible to reduce the thickness and weight of the unit cell 10. With the cell case 12, for example, the power generating element 14 can be accommodated in a bag made of, for example, a metal laminated film (typically, an aluminum/PP laminated sheet), and the bag can be sealed by thermal welding, thereby shielding the power generating element 14 from the external environment. At this time, a positive electrode terminal 16a and a negative electrode terminal 16b as external connection terminals 16 are drawn out of the cell case 12. The positive electrode terminal 16a is electrically connected to the positive electrode current collector of the power generating element 14, and the negative electrode terminal 16b is electrically connected to the negative electrode current collector of the power generating element 14. However, the cell case 12 is not limited to the one made of a metal laminated film, and may be a container made of aluminum, steel, high-strength plastic, or the like and having a square shape, a cylindrical shape, or the like.

As shown in FIG. 3(a) to (c), the unit cell 10 includes a rectangular plate-shaped power generating element 14 that is elongated in the longitudinal direction Y in a plan view. In the power generating element 14, a positive electrode active material layer, a solid electrolyte layer, and a negative electrode active material layer, each of a rectangular shape in a plan view, are laminated in the thickness direction. The cell case 12 that houses the power generating element 14 is also a rectangle elongated in the longitudinal direction Y in a plan view. In the portion of the cell case 12 where the power generating element 14 is not present, the metal laminated film is welded, and the thickness (dimension in the arrangement direction Z) in a front view and a side view is small. An external connection terminal 16 is disposed so as to protrude from an end portion of the front side F of the cell case 12 in the longitudinal direction Y. The positive electrode terminal 16a and the negative electrode terminal 16b of the external connection terminal 16 are arranged apart from each other in the width direction X. A plurality of such unit cells 10 is arranged and stacked in such a manner that the thickness direction of the power generating elements 14 is in the arrangement direction Z. As a result, a cell stack composed of a plurality of arranged unit cells is configured.

Restraint Mechanism

The restraint mechanism 20 includes a pair of end plate portions 21, 22 and a restraining hoop portion 24. The end plate portions 21, 22 are plate-shaped members for uniformly applying a restraining pressure to the power generating elements 14 of the unit cells 10. The restraining hoop portion 24 is a member by which the restraining pressure applied between the end plate portions 21, 22 is confined and maintained between the end plate portions 21, 22.

The pair of end plate portions 21, 22 are disposed at both ends of the arranged plurality of unit cells 10 so as to sandwich the arranged unit cells 10 in the arrangement direction Z. The first end plate portion 21 is disposed at the end portion in a first direction Z1 (upper side U) of the arrangement direction Z of the arranged unit cells 10. The second end plate portion 22 is arranged at the end portion in a second direction Z2 (lower side D) of the arrangement direction Z of the arranged unit cells 10. The end plate portions 21, 22 are disposed to be perpendicular to the arrangement direction Z so that the end plate portions are parallel to each other. The size of the end plate portions 21, 22 in the width direction X is slightly larger than the size of the cell case 12 of the unit cell 10. The size of the end plate portions 21, 22 in the longitudinal direction Y is slightly larger than the size of the power generating element 14 of the unit cell 10. The end plate portions 21, 22 are configured to be slightly larger than the power generating element 14 of the unit cell 10. Further, in the front view of the first end plate portion 21, right and left corner portions in the width direction X on the upper U side are rounded and curved. In the front view of the second end plate portion 22, right and left corner portions in the width direction X on the lower side D are rounded and curved.

The restraining hoop portion 24 has a ring-shaped belt form. The restraining hoop portion 24 has an upper surface portion 24U disposed on the upper side U along the surface of the upper side U of the first end plate portion 21. The restraining hoop portion 24 has a lower surface portion 24D disposed on the lower side D along the surface of the lower side D of the second end plate portion 22. In the restraining hoop portion 24, a flat left side surface portion 24L continuously connecting the upper surface portion 24U and the lower surface portion 24D along the arrangement direction Z is provided on the left side L so as to extend from the left end of the first end plate portion 21 to the left end of the second end plate portion 22. In the restraining hoop portion 24, a flat right surface portion 24R continuously connecting the upper surface portion 24U and the lower surface portion 24D along the arrangement direction Z is provided on the right side R so as to extend from the right end of the first end plate portion 21 to the right end of the second end plate portion 22. As a result, in the cross section parallel to the arrangement direction Z and the width direction X, the restraining hoop portion 24 annularly surrounds the stack composed of the first end plate portion 21, the arranged plurality of unit cells 10 and the second end plate portion 22 along the outer periphery of the stack. In the present embodiment, the restraint mechanism 20 includes a total of two restraining hoop portions 24, one on the front side F and the other on the rear side Rr in the longitudinal direction Y of the end plate portions 21, 22. The upper surface portion 24U and the lower surface portion 24D are examples of the first support portion and the second support portion in the cell pack 1 disclosed herein.

Figure 4A:
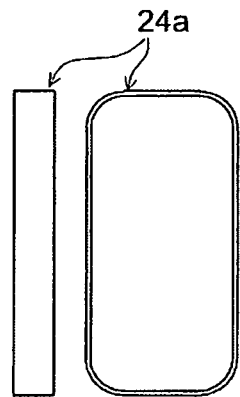
FIGS. 4A to 4D are side and front views schematically illustrating the configuration of the restraining hoop portion.
Figure 4B:
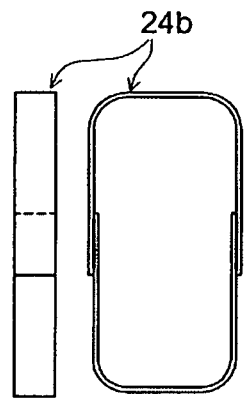
Figure 4C:
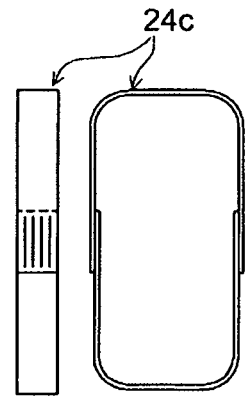
Figure 4D:
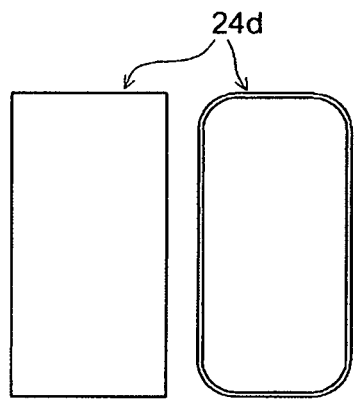
Figure 4E:
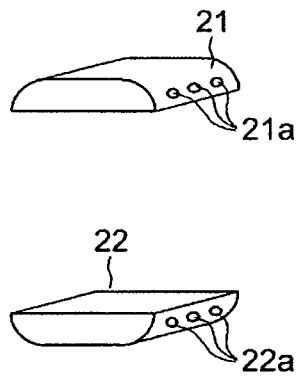
FIG. 4E is a perspective view schematically illustrating the configuration of an end plate portion.

As shown in FIG. 4E, jig holes 21a, 22a penetrating in the width direction X are provided in the end plate portions 21, 22, respectively, near the center in the thickness direction. The jig holes 21a, 22a are holes for inserting mounting jigs 55u, 55d (see FIGS. 6A and 6B) used in the below-described production and disassembling of the cell pack 1 into the end plate portions 21, 22 and passing the jigs therethrough. A total of three jig holes 21a, 22a are provided, one on the front side F, one on the rear side Er, and one in the center in the longitudinal direction Y. The jig holes 21a and 22a are provided at equal intervals along the longitudinal direction Y so as to be disposed at both ends of the two restraining hoop portions 24 and in the middle thereof. However, these number, placement and the like of the jig holes 21a, 22a are not limiting.

Since the restraining hoop portion 24 is closed in a ring shape, the separation distance of the end plate portions 21, 22 is regulated. The dimension, in the arrangement direction Z, of the left side surface portion 24L and the right side surface portion 24R of the restraining hoop portion 24 is equal to the dimension, in the arrangement direction Z, of the plurality of unit cells 10 restrained in the arranged state. As a result, in the restraining hoop portion 24, the dimension of the left side surface portion 24L and the right side surface portion 24R in the arrangement direction Z are determined so that the restraining pressure applied to the unit cell 10 has a predetermined value. For example, as a result of making the dimension of the left side surface portion 24L and the right side surface portion 24R in the arrangement direction Z less than the dimension of the cell stack in an unloaded state in the arrangement direction Z, the restraining hoop portion 24 can confine the restraining pressure applied to the unit cells 10 and restrain the cell stack. Further, in the restraining hoop portion 24, the dimension of the left side surface portion 24L and the right side surface portion 24R in the arrangement direction Z is determined so that the reaction force from the cell stack acting against the restraining pressure does not result in yield. In other words, for example, since the restraining hoop portion 24 is deformed in the elastic region in the tensile direction along the arrangement direction Z, a high restraining pressure acting in the compression direction with respect to the unit cell 10 can be confined. The restraining pressure applied to the unit cell 10 is maintained by the restraining hoop portion 24. The restraining hoop portion 24 is configured so as to be able to maintain an unprecedentedly high restraining pressure of, for example, about 0.1 MPa to 110 MPa, with respect to the unit cell 10. The restraining pressure may be, for example, 1 MPa or more, 10 MPa or more, 30 MPa or more, 50 MPa or more, 80 MPa or more, and 100 MPa or more. The load applied to the long side surface of the unit cell 10 can be increased according to the tensile strength of the restraining hoop portion 24 to an unprecedented value, for example, 2 t or more, 5 t or more, 8 t or more, and 10 t or more. Since the corner portions of the end plate portions 21, 22 (the corner portions from the outer surface on the side opposite to the unit cells 10 in the arrangement direction Z to the side surface in the width direction X) are curved, the restraining pressure is prevented from locally acting on the restraining hoop portion 24.

The end plate portions 21, 22 can be made of various materials that are not deformed by the restraining pressure applied to the unit cells 10 along the arrangement direction Z. Examples of the constituent material of the end plate portions 21, 22 include metal materials typified by aluminum or an aluminum alloy, iron or various steel materials (for example, structural steel), high-strength alloys and the like, resin materials such as reinforced plastics, engineering plastics and the like, inorganic materials having high flexural strength such as fine ceramics, carbon fiber materials and the like, and composite materials thereof such as carbon fiber reinforced plastics (CFRP) and the like. In addition, the restraining hoop portion 24 can be made of various materials having a tensile strength such that the reaction force from the unit cells 10 against the restraining force in the arrangement direction Z does not cause plastic deformation (stretching) such that exceeds the yield point or breaking. Examples of such a hoop constituting material include metal materials typified by aluminum or an aluminum alloy, iron or various steel materials (for example, structural steel), high-strength alloys and the like, resin materials such as reinforced plastics, engineering plastics and the like, inorganic materials having high tensile strength such as carbon fiber materials and the like, and composite materials thereof such as carbon fiber reinforced plastics (CFRP) and the like.

As an example, as shown in FIGS. 4A and 4D, the restraining hoop portion 24 has a seamless ring-shaped structure made of a single material. Such a restraining hoop portion 24 can be produced by using various conventionally known methods. When the hoop constituting material is a resin material, a seamless tubular resin hoop can be obtained by, for example, an injection molding method, a casting method or the like. When the hoop constituting material is a metal material, a seamless tubular metal hoop can be obtained by, for example, a cutting method, a centrifugal casting method, piercing rolling, or the like. When the hoop constituting material is a resin material or a metal material, a tubular closed resin hoop or metal hoop can be obtained, for example, by bending a sheet-shaped hoop constituting material into a tubular shape corresponding to the cross sectional shape of the restraining hoop portion and then solid-bonding the end portions. Furthermore, when the hoop constituting material is CFRP, a tubular CFRP hoop can be obtained by, for example, annularly winding a prepreg sheet composed of a carbon fiber and a parent phase resin material such as an epoxy resin around a metal mold corresponding to the cross-sectional shape of the restraining hoop portion and integrating by heating. The restraining hoop portions 24 can be obtained by cutting these tubular hoops to a desired hoop width. As a result of increasing the width of the restraining hoop portion 24, the restraining hoop portion 24 can enclose a higher restraining pressure.

Meanwhile, as an example, the restraining hoop portion 24 may have a seamed ring-shaped structure as shown in FIGS. 4B and 4C. When the restraining hoop portion 24 has seams, in order to equalize the tensile strength between the left side surface portion 24L and the right side surface portion 24R of the restraining hoop portion 24, seams are preferably provided on the left side surface portion 24L and the right side surface portion 24R. Such a restraining hoop portion 24 can be formed, for example, by overlapping and joining end portions of two members which are U-shaped (semi-annular) when viewed from the front. Examples of joining methods include a method of joining via a joining material such as an adhesive, as shown in FIG. 4B, and methods for direct joining which do not use a joining material, such as a laser welding method, a resistance welding method, a solid phase bonding method, or the like (see FIG. 4C).

Here, for example, when two U-shaped members are overlapped and joined to form a ring, a vector of tensile stress acting on the restraining hoop portion 24 is slightly shifted in the width direction X at the U-shaped one member and another member. When the restraining pressure for restraining the unit cell 10 is small, such a shift in the vector of tensile stress causes no problem, but where the restraining pressure rises to a level that has not been heretofore reached (typically, about 5 times or more, for example, about 10 times or more of the level used in the related art), the restraining hoop portion 24 sometimes deforms the joining portion in the direction of correcting the shift of the vector of tensile stress. As a result, the tensile stress acting on the restraining hoop portion 24 tends to locally concentrate at, for example, the upper or lower end of the joining portion, and the U-shaped one member and other member can be broken starting from the upper or lower end of the joining portion. From such a viewpoint, it is more preferable that the restraining hoop portion 24 have a seamless ring shape as shown in FIGS. 4A and 4D.

The dimension of the restraining hoop portion 24 in the hoop width direction corresponding to the longitudinal direction Y is not particularly limited. For example, the total dimension of one or a plurality of restraining hoop portions 24 in the hoop width direction may be ¼ or more of the dimension of the power generating element 14 in the longitudinal direction Y (that is, in the hoop width direction). For example, when the restraint mechanism 20 is provided with two restraining hoop portions 24, the dimension of each of the restraining hoop portions 24 in the hoop width direction may be ⅛ or more of the dimension of the power generating element in the hoop width direction. As a result, the plurality of unit cells 10 can be stably restrained by the restraint mechanism 20. The total dimension of the restraining hoop portion 24 in the hoop width direction may be ⅓ or more, preferably ½ or more, more preferably ⅔ or more, and may be ¾ or more, or ⅚ or more of the dimension of the power generating element in the longitudinal direction Y. The total dimension of the restraining hoop portion 24 in the hoop width direction can be set to, for example, 1.1 or less and may be 1 or less and 0.9 or less of the dimension of the power generating element 14 in the longitudinal direction Y to ensure the balance between the assembling accuracy and cost reduction. When the dimension of the hoop width of the restraining hoop portion 24 is ½ or more of the dimension of the power generating element 14 in the longitudinal direction Y, the restraint mechanism 20 may be provided with only one such a wide restraining hoop portion 24. With such a configuration as well, the plurality of unit cells 10 can be stably restrained by the restraint mechanism 20.

With such a configuration, the restraint mechanism 20 surrounds the outer peripheries of the pair of end plate portions 21, 22 by the ring-shaped restraining hoop portion 24, thereby restraining the plurality of unit cells 10 in the direction of compressing along the arrangement direction Z. In the restraint mechanism 20, the restraining hoop portion 24 is not fixed by using a separate member such as a fastener. Therefore, the restraint mechanism 20 includes no fastener that can be plastically deformed or broken, the restraint of the unit cells 10 can be prevented from loosening and the restraining pressure necessary for the unit cells 10 can be maintained for a long period. This can be particularly effective, for example, in the cell pack 1 in which vibration, impact or the like occurs during use. Further, such an effect is particularly advantageously demonstrated with the cell pack 1 which requires an unprecedentedly high restraining pressure, for example, when the unit cell 10 is an all-solid state cell for which the application of compressive stress is desirable in order to reduce the interfacial resistance or when a material having a large volume expansion rate in charging and discharging is used as the active material.

Production Method 1

The cell pack 1 having the above configuration can be suitably produced, as shown, for example, in FIG. 5, by following the production steps S1 to S5 described hereinbelow.

(S1) Preparing a cell stack $S_A$
(S2) disposing the first end plate portion 21, the second end plate portion 22 and the restraining hoop portion 24
(S3) stretching the restraining hoop portion 24
(S4) inserting the cell stack $S_A$ between the end plate portions 21, 22
(S5) restraining the plurality of unit cells 10

Figure 6A:
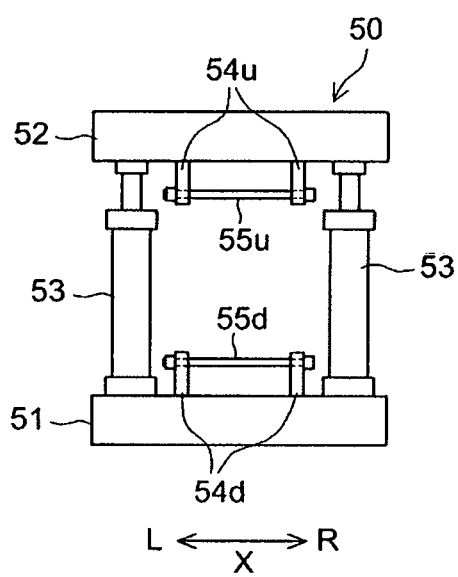
FIGS. 6A and 6B are respectively a front view and a side view schematically illustrating the configuration of a cell pack assembling device.
Figure 6B:
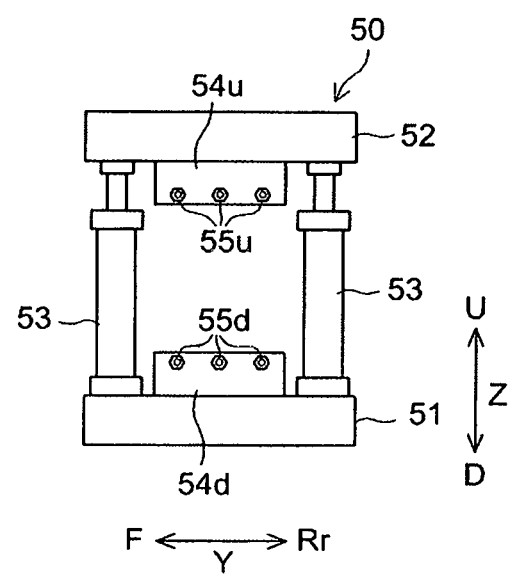

Such a method for producing the cell pack 1 can be suitably implemented, for example, by using a cell pack assembling device 50 shown in FIGS. 6A and 6B. That is, the cell pack assembling device 50 includes, as main components, a base portion 51, a top plate portion 52, and four hydraulic pistons 53. The hydraulic pistons 53 are erected at four corners of the base portion 51 so that the central axis thereof extends along the vertical direction. The vertical direction coincides with the arrangement direction Z of the cell pack 1. The hydraulic pistons 53 fixedly support the four corners of the top plate portion 52 from the lower side D. The hydraulic pistons 53 are configured so that the distance between the base portion 51 and the top plate portion 52 can be arbitrarily changed by vertically moving the top plate portion 52 along the vertical direction.

A pair of end plate holders 54u for fixing the first end plate portion 21 to the top plate portion 52 is provided so as to face each other on the lower surface of the top plate portion 52. A pair of end plate holders 54d for fixing the second end plate portion 22 to the base portion 51 is provided so as to face each other on the upper surface of the base portion 51. In the pairs of the end plate holders 54u, 54d, through holes (not shown) are provided on the same axis along the width direction X. Bolt-nut type mounting jigs 55u, 55d are detachably provided in the opposing through holes of the end plate holders 54u, 54d so as to communicate through the through holes. In the cell pack assembling device 50 of the present embodiment, three through holes are provided at equal intervals along the longitudinal direction Y in the end plate holders 54u, 54d. The positions of the through holes provided in the end plate holders 54u, 54d and the jig holes 21a, 22a provided in the end plate portions 21, 22 correspond to each other.

Figure 5:
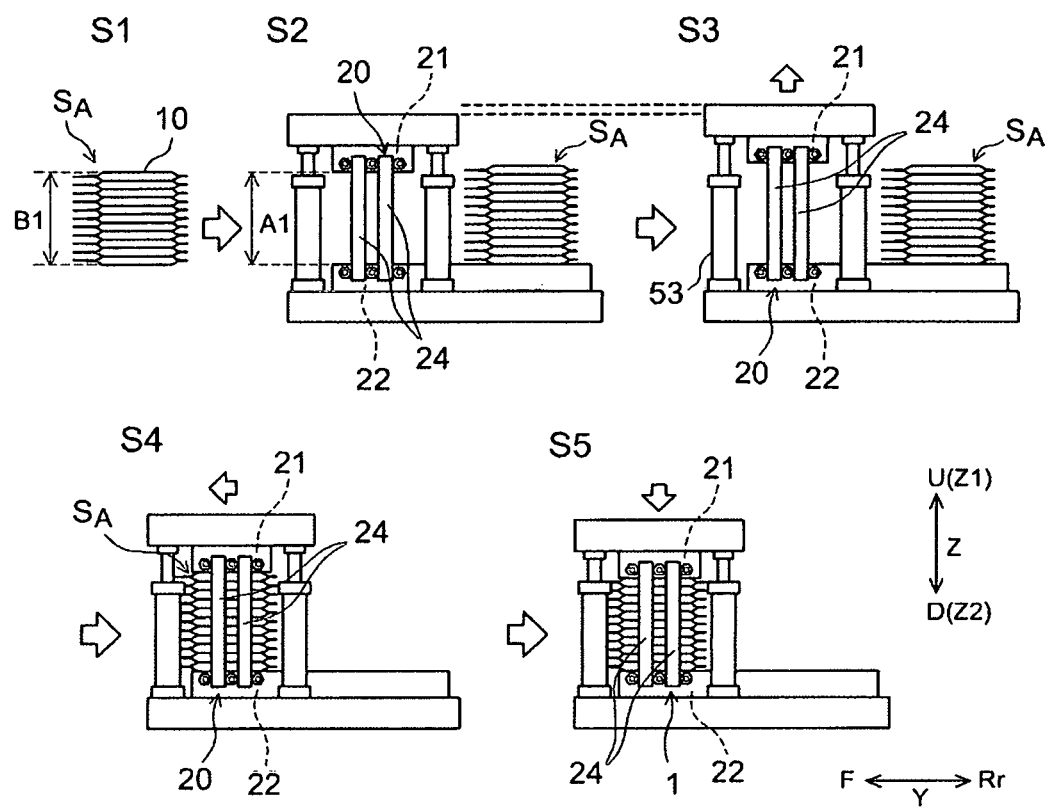
FIG. 5 is a process diagram illustrating a method for producing a cell pack according to one embodiment.

First, in the production step S1, as shown in FIG. 5, a plurality of unit cells 10 is arranged such that the thickness direction is the arrangement direction Z. As a result, the cell stack $S_A$ in which the plurality of unit cells 10 are arranged is prepared. Here, the plurality of unit cells 10 are laminated by aligning the width direction X and the longitudinal direction Y so that the power generating elements 14 to which the compressive stress is to be applied are aligned in the arrangement direction Z. The dimension of the prepared cell stack $S_A$ in the arrangement direction Z is B1. The cell stack $S_A$ may be preliminarily compressed by pressing in the arrangement direction Z before being inserted between the end plate portions 21, 22 in the subsequent step.

In the production step S2, the first end plate portion 21 and the second end plate portion 22 of the restraint mechanism 20 are arranged apart from each other along the arrangement direction Z, and the ring-shaped restraining hoop portion 24 is disposed so as to surround the first end plate portion 21 and the second end plate portion 22 by planes parallel to the arrangement direction Z. At this time, the first end plate portion 21 may be inserted in advance into the ring of the restraining hoop portion 24, and in this state the first end plate portion 21 may be fixed to the end plate holder 54u of the cell pack assembling device 50. When fixing to the end plate holder 54u, the first end plate portion 21 may be disposed so that the position of the jig hole 21a and the position of the through hole are aligned on the same axis between the pair of end plate holders 54u, and the mounting jig 55u may be inserted into the jig hole 21a and the through hole and fixed with a nut. Likewise, with respect to the second end plate portion 22, the second end plate portion 22 may be inserted in advance into the ring of the restraining hoop portion 24, and in this state the second end plate portion 22 may be fixed to the base portion 51. When fixing to the end plate holder 54d, the second end plate portion 22 may be disposed so that the position of the jig hole 22a and the position of the through hole are aligned on the same axis between the pair of end plate holders 54d, and the mounting jig 55d may be inserted into the jig hole 22a and the through hole and fixed with a nut. As a result, the restraint mechanism 20 can be set in the cell pack assembling device 50. Here, the dimension of the left side surface portion 24L and the right side surface portion 24R of the restraining hoop portion 24 along the arrangement direction Z is A1. The separation distance between the first end plate portion 21 and the second end plate portion 22 is also A1. The dimension A1 and the dimension B1 satisfy A1<B1. The dimension A1 is determined so as to substantially match the dimension when the cell stack $S_A$ is compressed by a predetermined restraining pressure in the cell pack 1.

In the production step S3, the first end plate portion 21 is relatively displaced in the first direction Z1 on the side opposite to the second end plate portion 22 in the arrangement direction Z. The degree of displacement may be adjusted so that the separation distance between the first end plate portion 21 and the second end plate portion 22 is equal to or greater than the dimension B1 of the cell stack $S_A$ in the arrangement direction Z. The hydraulic piston 53 of the cell pack assembling device 50 may be driven to displace the first end plate portion 21. As a result, the restraining hoop portion 24 can be stretched in the arrangement direction Z. However, the degree of displacement of the first end plate portion 21 is limited to the range in which the restraining hoop portion 24 is extended in the elastic region. In other words, the displacement amount of the first end plate portion 21 is determined so that the restraining hoop portion 24 does not undergo yield deformation due to stretching. The dimension B1 of the cell stack $S_A$ in the arrangement direction Z is determined so that the dimension A1 of the left and right side surface portions 24L, 24R of the restraining hoop portion 24 along the arrangement direction Z can become the dimension B1 without causing the yield. In the cell pack assembling device 50 disclosed herein, four hydraulic pistons 53 are used to displace the first end plate portion 21. This makes it possible to control the stretching of the restraining hoop portion 24 having a high tensile strength with high accuracy.

In the production step S4, the cell stack $S_A$ is inserted between the displaced first end plate portion 21 and the second end plate portion 22. For example, the restraining hoop portion 24 is disposed so as to form a ring in a plane perpendicular to the longitudinal direction Y. Therefore, the cell stack $S_A$ may be inserted between the first end plate portion 21 and the second end plate portion 22, for example, by sliding the cell stack disposed on the rear side Rr of the stretched restraining hoop portion 24 in the longitudinal direction Y to the front side F. As a result, the cell stack $S_A$ can be smoothly inserted into the restraint mechanism 20.

In the production step S5, the displacement of the first end plate portion 21 is released. For example, the force maintaining the displacement of the first end plate portion 21 can be released by releasing the pressure of the four hydraulic pistons 53. As a consequence, the restraining hoop portion 24, which has been extended elastically, contracts so as to return to the original dimension A1. As a result, the first end plate portion 21 is relatively displaced toward the second end plate portion 22. Thus, the first end plate portion 21, the second end plate portion 22, and the restraining hoop portion 24 can apply a load to the plurality of unit cells 10 in a direction of compressing along the arrangement direction Z. As a result, it is possible to restrain the plurality of unit cells 10 in the arranged state. After releasing the pressure of the hydraulic piston 53, the cell pack 1 can be obtained by removing the mounting jigs 55u, 55d from the end plate holders 54u, 54d.

It should be noted that various inconveniences may occur when the cell pack 1 having the configuration disclosed herein is to be produced, for example, by the same method as the method for producing a conventional cell pack. For example, as shown in FIGS. 13A and 13B, in a conventional cell pack 101, a cell stack composed of a plurality of unit cells 110 is sandwiched between a pair of end plate portions 121, 122 and compressed under a predetermined compressive stress, and in this state, a conventional U-shaped restraining band 124 is fixed to the end plate portions 121, 122. Here, with the conventional U-shaped restraining band 124, a mounting space for the restraining band 124 can be ensured at the end portions of the end plate portions 121, 122 while uniformly pressing almost all the surfaces of the end plate portions 121, 122 to compress the unit cells 110. However, where the ring-shaped restraining hoop portion 24 is to be attached in place of the restraining band 124, it is necessary to mount the restraining hoop portion 24 so as to extend over the width direction X of the end plate portions 21, 22. Therefore, the mounting space is difficult to ensure. For example, an attempt can be made to mount the ring-shaped restraining hoop portion 24 on a non-pressing region, without pressing both end portions of the end plate portions 21, 22 in the longitudinal direction Y. In such a case, in the cell stack and the end plate portions, although the central portion in the longitudinal direction Y is locally pressed, the non-pressing area is not pressed, so that the cell stack and the end plate portions are deflected in the longitudinal direction Y and the end portions in the longitudinal direction Y expand outside in the arrangement direction Z. As a result, the size of the ring-shaped opening of the restraining hoop portion 24 becomes relatively small, and it is impossible to insert the end portions of the expanded cell stack $S_A$ and the end plate portions 21, 22.

By contrast, according to the method disclosed herein, a gap for inserting the cell stack SA between the end plate portions 21, 22 is appropriately ensured by elastically deforming the restraining hoop portion 24 by pulling. As a result, the ring-shaped restraining hoop portion 24 can be fitted to the outer peripheries of the pair of end plate portions 21, 22, and the end plate portions 21, 22 and the cell stack $S_A$ can be bundled by the restraining hoop portion 24.

Disassembling Method 1

Figure 7:
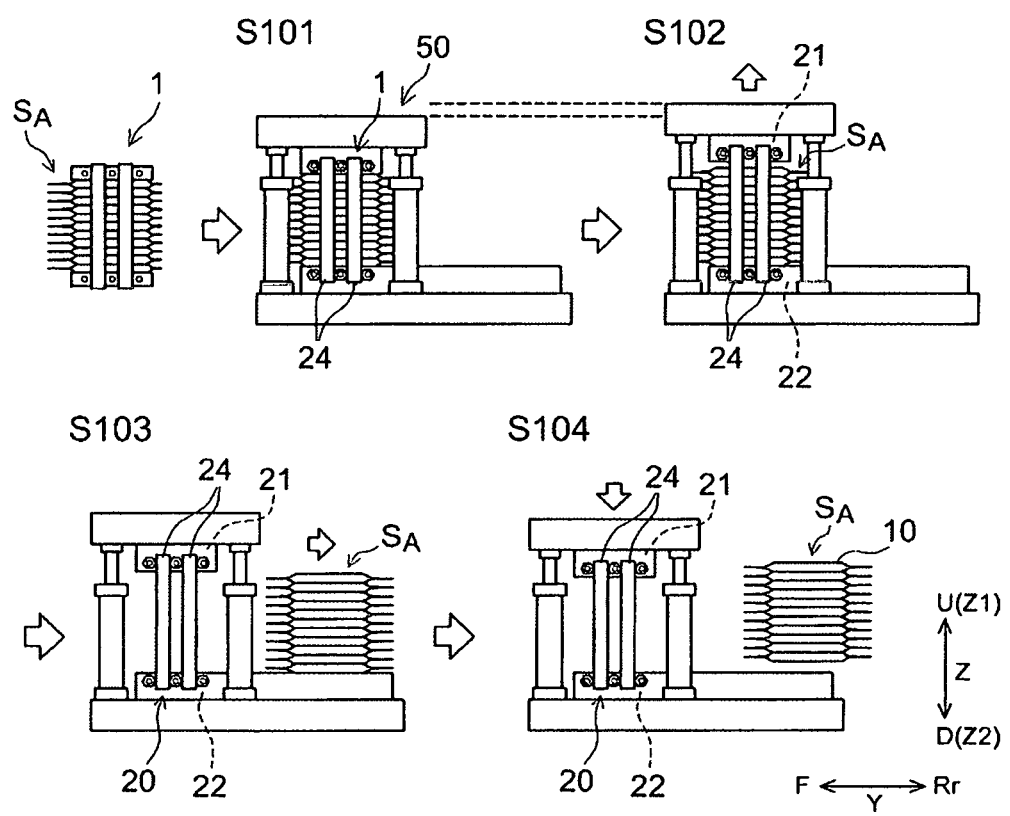
FIG. 7 is a process diagram illustrating a method for disassembling a cell pack according to one embodiment.
Figure 8:
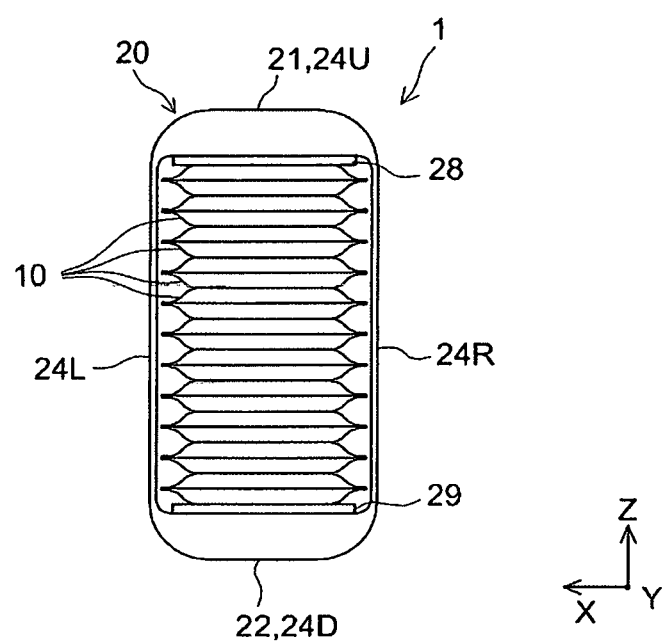
FIG. 8 is a front view schematically illustrating a cell pack according to another embodiment.
Figure 9:
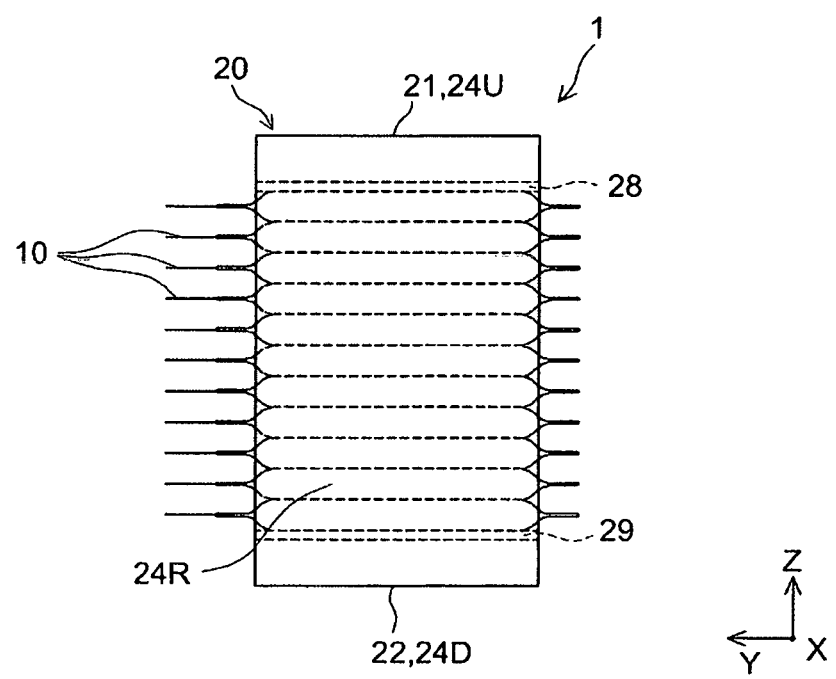
FIG. 9 is a side view schematically illustrating the cell pack of FIG. 8.
Figure 10A:
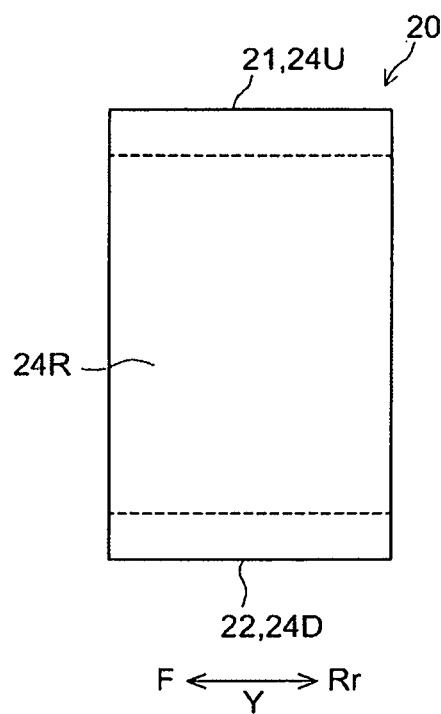
FIGS. 10A and 10B are respectively a side view and a front view schematically illustrating the configuration of a restraining hoop portion.
Figure 10B:
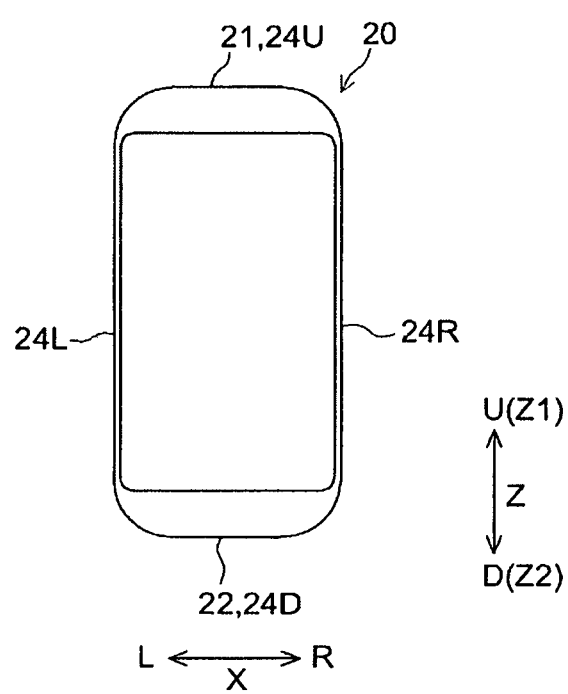

With the cell pack 1 enclosing a high restraining pressure, as described above, where the restraining pressure is abruptly released at the time of disassembling, there is a danger that the cell stack $S_A$ or the restraint mechanism 20 will be scattered violently to the surroundings. Here, the above-described cell pack assembling device 50 can also be suitably used for disassembling the cell pack 1, for example, as shown in FIG. 7, by following the disassembling steps S101 to S104 described below.

That is, in the disassembling step S101, the cell pack 1 is set in the cell pack assembling device 50. Specifically, first, the first end plate portion 21 of the cell pack 1 is fixed to the end plate holder 54u of the cell pack assembling device 50. Here, the mounting jig 55u is detached in advance from the end plate holder 54u. Next, the first end plate portion 21 may be disposed so that the position of the jig hole 21a and the position of the through hole are aligned on the same axis between the pair of end plate holders 54u, and the mounting jig 55u may be inserted into the jig hole 21a and the through hole and fixed with a nut. Next, the second end plate portion 22 is fixed to the base portion 51. Here, likewise, the mounting jig 55d is detached in advance from the end plate holder 54d. Next, the second end plate portion 22 is disposed so that the position of the jig hole 22a and the position of the through hole are aligned on the same axis between the pair of end plate holders 54d, and the mounting jig 55d is inserted into the jig hole 22a and the through hole and fixed with a nut. When mounting the cell pack 1, the distance between the base portion 51 and the top plate portion 52 may be adjusted to a distance suitable for fixing the end plate portions 21, 22 of the cell pack 1 by adequately controlling the pressure of the hydraulic piston 53.

Next, in the disassembling step S102, the first end plate portion 21 is displaced relative to the second end plate portion 22 in the first direction Z1. The degree of displacement of the first end plate portion 21 when disassembling the cell pack 1 may be in the range in which the restraining hoop portion 24 extends in the elastic region or in the range in which the restraining hoop portion 24 yields and plastically deforms. Here, where the restraining hoop portion 24 is plastically deformed, the restraining force confined in the restraining hoop portion 24 can be released. However, from the viewpoint of safety, the degree of displacement of the first end plate portion 21 is preferably such that the restraining hoop portion 24 does not break, and from the viewpoint of efficient disassembling, the degree of displacement may be within the range in which the restraining hoop portion 24 extends in the elastic region. In addition, it is preferable that the displacement of the first end plate portion 21 be performed slowly in order to avoid a sudden release of the restraining pressure of the cell stack $S_A$. As a result, it is possible to release the restraining pressure from the cell stack $S_A$ while preventing the cell stack $S_A$ from scattering or the like due to abrupt release of the restraining pressure. Further, it is possible to secure a gap for taking out the cell stack $S_A$ from between the first end plate portion 21 and the second end plate portion 22.

In the disassembling step S103, the cell stack $S_A$ is taken out from between the displaced first end plate portion 21 and the second end plate portion 22. For example, the restraining hoop portion 24 is disposed so as to form a ring in a plane perpendicular to the longitudinal direction Y. Therefore, the cell stack $S_A$ may be taken out from between the first end plate portion 21 and the second end plate portion 22, for example, by sliding the cell stack disposed on the front side F of the stretched restraining hoop portion 24 in the longitudinal direction Y to the rear side Rr. As a result, the cell stack $S_A$ can be smoothly taken out from the restraint mechanism 20.

In the disassembling step S104, the displacement of the first end plate portion 21 is released. For example, the force maintaining the displacement of the first end plate portion 21 can be released by releasing the pressure of the four hydraulic pistons 53. As a consequence, although no change is observed with respect to the restraining hoop portion 24 which has been plastically deformed, the restraining hoop portion 24 which has been extended in the elastic region elastically contracts to return to the original dimension. As a result, the first end plate portion 21 is relatively displaced toward the second end plate portion 22. Thus, it is possible to release the restraining pressure from the restraining hoop portion 24 confining the restraining pressure, and the cell pack 1 can be safely disassembled.

Second Embodiment

Restraint Mechanism

In the cell pack 1 of the first embodiment described above, the restraint mechanism 20 is provided with two restraining hoops 24. The merits of the configuration disclosed herein is that where only one restraining hoop portion 24 having a relatively large width in the longitudinal direction Y is provided, as shown in FIG. 4D, in addition to reducing the number of parts, the end plate portions 21, 22 and the cell stack $S_A$ can be restrained in a stable manner with a stronger restraining force. Accordingly, with the restraint mechanism 20 of the present embodiment, the first end plate portion 21, the second end plate portion 22, and the restraining hoop portion 24 are integrally molded of one material, for example, as shown in FIGS. 8, 9, 10A, and 10B. In other words, the pair of end plate portions 21, 22 and the restraining hoop portion 24 are a single constituent member rather than a combination of a plurality of constituent members. In the cell pack 1 of the present embodiment, the configuration of the unit cell 10, that is, a component of the cell pack other than the restraint mechanism 20, is the same as that of the above-described first embodiment, so duplicate explanation will be omitted.

The widths of the first end plate portion 21, the second end plate portion 22 and the restraining hoop portion 24 in the longitudinal direction Y are not necessarily the same. However, from the viewpoint of stably maintaining a higher restraining pressure confined in the restraint mechanism 20, the widths of the first end plate portion 21, the second end plate portion 22 and the restraining hoop portion 24 in the longitudinal direction Y may be substantially the same. In other words, the dimensions of the first end plate portion 21 and the second end plate portion 22 in the longitudinal direction Y and the dimensions of the left side surface portion 24L and the right side surface portion 24R of the restraining hoop portion 24 in the longitudinal direction Y are preferably the same. The dimension of the restraint mechanism 20 in the longitudinal direction Y is preferably slightly larger (for example, about 1 to 1.1 times or less) than the dimension of the power generating element 14 in the longitudinal direction Y. Further, the dimension of the restraint mechanism 20 in the longitudinal direction Y can be made smaller than the dimension of the unit cell 10 in the longitudinal direction Y. Since the constituent material of the restraint mechanism 20 and the forming method thereof can be grasped by a person skilled in the art in the same manner as in the first embodiment, duplicate explanation will be omitted.

Production Method 2

Figure 11:
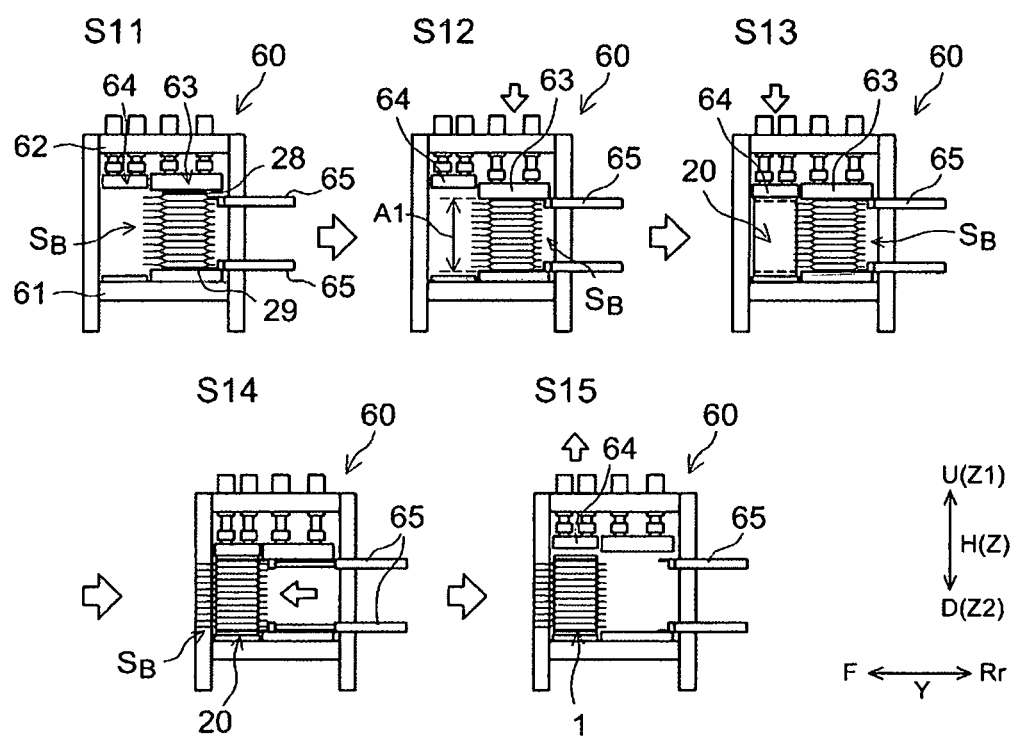
FIG. 11 is a process diagram illustrating a method for producing the cell pack according to another embodiment.

The negative consequence of increasing the width of the restraining hoop portion 24 in the longitudinal direction Y is that the force required for elastically deforming the restraining hoop portion 24 in the method of producing the cell pack is greatly increased and the productivity of the cell pack 1 is poor. Therefore, the cell pack 1 having the configuration according to the second embodiment can be suitably produced by following the production steps S11 to S15, for example, as shown in FIG. 11.

(S11) preparing a cell stack $S_B$ by arranging a plurality of unit cells 10 and sliding plates 28, 29 in the arrangement direction Z (S12) compressing the cell stack $S_B$ in the arrangement direction Z (S13) installing the expansion suppressing jig 64 in the restraint mechanism 20 including the first end plate portion 21, the second end plate portion 22, and the ring-shaped restraining hoop portion 24

(S14) inserting the cell stack $S_B$ between the end plate portions 21, 22

(S15) restraining the plurality of unit cells 10

Such a method for producing the cell pack 1 can be suitably implemented, for example, by using a cell pack assembling device 60 shown in FIG. 11. That is, the cell pack assembling device 60 includes a base portion 61, a top plate portion 62, a compressing portion 63, an expansion suppressing jig 64, and a slider mechanism 65. The cell pack assembling device 60 includes a housing including the base portion 61, the top plate portion 62, and left and right side walls standing on the base portion 61 and supporting the top plate portion 62. The space inside the housing includes a compression area on the rear side Rr and an assembly area on the front side F.

The compressing portion 63 is a mechanism for compressing the cell stack $S_B$, and is disposed in the compression area on the rear side Rr. The compressing portion 63 is connected to four hydraulic pistons and these hydraulic pistons are fixed to the four corners of the top plate portion 62 of the compression area so that the central axis is along the height direction H in which the central axis coincides with the vertical direction. The hydraulic pistons in the compression area move the compressing portion 63 to the lower side D or the upper side U in the height direction H, thereby making it possible to compress the object to be compressed (here, the cell stack $S_B$) which is disposed on the base portion 61 in the compression area or to release the compression. A load cell (not shown) is disposed on the base portion 61 in the compression area and is configured to or programmed to be capable of detecting the compression load applied by the compressing portion 63 to the object to be compressed.

The expansion suppressing jig 64 is a mechanism for suppressing the expansion of the restraining hoop portion 24 in the arrangement direction Z, and is disposed in the assembly area on the front side F. The expansion suppressing jig 64 is connected to four hydraulic pistons and these hydraulic pistons are fixed to the four corners of the top plate portion 62 in the assembly area so that the central axis is along the height direction H.

The slider mechanism 65 for slidably moving the cell stack $S_B$ is provided on a side wall on the rear side Rr of the housing. The slider mechanism 65 includes one hydraulic piston on each of the upper side U and the lower side D. These hydraulic pistons are fixed to the side wall on the rear side Rr so that the central axis is along the longitudinal direction Y coincident with the horizontal direction. The slider mechanism 65 is configured so that the position thereof in the height direction H can be adjusted so as to correspond to the height positions of the sliding plates 28, 29 in the compressed cell stack $S_B$ described hereinbelow. When the slider mechanism 65 is driven in the forward direction F along the longitudinal direction Y, the cell stack $S_B$ arranged in the compression area can be slidably moved to the assembly area. On the base portion 61, spacers for adjusting the position of the placed member in the height direction H are provided separately for the compression area and the assembly area.

In step S11, the plurality of unit cells 10 is arranged in the arrangement direction Z, the first sliding plate 28 is disposed at the end portion in the first direction Z1 (upper side U) in the arrangement direction Z of the plurality of unit cells 10, and the second sliding plate 29 is disposed at the end portion in the second direction Z2 (lower side D). As a result, the cell stack $S_B$ having a form in which the plurality of unit cells 10 is sandwiched between the sliding plates 28, 29 in the arrangement direction Z is prepared.

Here, the sliding plates 28, 29 are plate-shaped members for sliding the cell stack $S_B$ in the longitudinal direction Y while suppressing the frictional resistance when inserting the cell stack $S_B$ between the end plate portions 21, 22 in a subsequent process. Therefore, it is preferable that the surfaces of the sliding plates 28, 29 which are in contact with the end plate portions 21, 22 have a low friction coefficient. In other words, it is preferable that the upper surface of the first sliding plate 28 and the lower surface of the second sliding plate 29 have a low friction coefficient. For the same reason, it is preferable that the lower surface of the compressing portion 63 and the upper surface of the compression area of the base portion 61 (which may be the upper surface of the spacer) have a low friction coefficient. The friction coefficients of the surfaces of the sliding plates 28, 29, the compressing portion 63, and the base portion 61 may be independently 0.5 or less, preferably 0.4 or less, and 0.3 or less. For example, 0.2 or less (typically, 0.20 or less) is particularly preferable. The friction coefficient of the surfaces of the sliding plates 28, 29 may be 0.15 or less (less than 0.15) or 0.1 or less. The sliding plates 28, 29 can be configured of, for example, a metal material having a smooth surface and typified by aluminum or an aluminum alloy, iron or various steel materials (for example, structural steel), high-strength alloys and the like, or a resin material such as a fluororesin, a reinforced plastic, an engineering plastic and the like. The sliding plates 28, 29 may be subjected to a surface treatment such as coating or polishing so as to realize the desired friction coefficient. The friction coefficient in the present specification means a static friction coefficient ($\mu_s$), and can be measured, for example, in accordance with JIS K 7125:1999.

It is preferable that the sliding plates 28, 29 have dimensions in the width direction X that are slightly larger than the dimensions of the power generating elements 14 of the unit cells 10 and smaller than the dimensions of the end plate portions 21, 22. The dimension of the sliding plates 28, 29 in the longitudinal direction Y is slightly larger than the dimension of the power generating elements 14 of the unit cells 10, and can be set to be approximately the same, for example, as the dimension of the end plate portions 21, 22 in the longitudinal direction Y. The sliding plates 28, 29 are configured to be slightly larger than the power generating elements 14 of the unit cells 10. The thickness of the sliding plates 28, 29 is not particularly limited, but from the viewpoint of stably realizing the sliding of the unit cells 10, the thickness can be, for example, about 0.5 mm to 5 mm and may be about 1 mm to 3 mm.

In step S12, the cell stack $S_B$ is compressed in the arrangement direction Z. Specifically, the cell stack $S_B$ is arranged in the compression area on the rear side Rr of the cell pack assembling device 60 so that the height direction H and the arrangement direction Z coincide. Then, by driving the hydraulic pistons in the compression area, the compressing portion 63 is moved to the lower side D to compress the cell stack $S_B$ until the dimension of the cell stack $S_B$ in the arrangement direction Z becomes the first dimension A1. The first dimension A1 is a dimension of the left side surface portion 24L and the right side surface portion 24R of the above-described restraining hoop portion 24 in the arrangement direction Z, which is equal to the separation distance between the first end plate portion 21 and the second end plate portion 22. The first dimension A1 is designed so that the power generating element 14 achieves a desired packing density when the dimension of the cell stack $S_B$ in the arrangement direction Z becomes the first dimension A1. The compressed cell stack $S_B$ can thus be prepared.

In step S13, the restraint mechanism 20 is prepared. Here, as described above, in the restraint mechanism 20, the first end plate portion 21, the second end plate portion 22, and the ring-shaped restraining hoop portion 24 are formed integrally as one constituent element. The dimension of the left side surface portion 24L and the right side surface portion 24R of the restraining hoop portion 24 in the arrangement direction Z is the first dimension A1 matching the separation distance between the first end plate portion 21 and the second end plate portion 22. The expansion suppressing jig 64 is then disposed with respect to the restraint mechanism 20 so as to restrict the separation distance between the first end plate portion 21 and the second end plate portion 22 from spreading beyond the first dimension A1. More specifically, the restraint mechanism 20 is disposed in the assembly area on the front side F of the cell pack assembling device 60 so that the arrangement direction Z is vertical, and the longitudinal direction Y is aligned with the front-rear direction. Thereafter, the position of the expansion suppressing jig 64 in the height direction H is adjusted so that the lower surface of the expansion suppressing jig 64 comes into contact with the upper surface of the first end plate portion 21.

In step S14, the compressed cell stack $S_B$ is inserted between the first end plate portion 21 and the second end plate portion 22. Here, by pushing the cell stack $S_B$ compressed in the compression area forward F by the slider mechanism 65, the cell stack $S_B$ is moved while sliding forward F. A frictional force corresponding to "compression stress×friction coefficient" can be generated when sliding the cell stack $S_B$ by the slider mechanism 65. As described above, the compressive stress of the cell stack $S_B$ created by the compressing portion 63 is higher than in the related art. Therefore, the frictional force generated when sliding the cell stack $S_B$ can become large and cannot be ignored. In the technique disclosed herein, as described above, the friction coefficient of the contact surfaces of the sliding plates 28, 29, the lower surface of the compressing portion 63, and the upper surface of the compression area of the base portion 61 is suppressed low, thereby suppressing the friction force.

When sliding the cell stack $S_B$, for the purpose of preventing the load on the power generating element 14 and also for the purpose of realizing efficient sliding of the cell stack $S_B$, it is preferable that only the side surface on the rear side Rr of the sliding plates 28, 29 of the cell stack $S_B$ be pushed by the slider mechanism 65. As a result, the cell stack $S_B$ can be inserted between the first end plate portion 21 and the second end plate portion 22 of the restraint mechanism 20. Further, the sliding plates 28, 29 are preferably tapered at the end of the front side F, which is at least the sliding direction in the longitudinal direction Y, so that the thickness decreases toward the cell stack $S_B$ as the front side F is approached. This configuration is preferable because when the cell stack $S_B$ is slid forward F, the cell stack $S_B$ is smoothly inserted between the end plate portions 21, 22 without buffering the sliding plates 28, 29 in the restraint mechanism 20. Further, at this time, the expansion suppressing jig 64 is disposed in the restraint mechanism 20. Therefore, it is possible to suppress the deterioration of the insertability of the cell stack $S_B$ due to elastic deformation of the restraining hoop portion 24 of the restraint mechanism 20 in the arrangement direction Z during the insertion of the cell stack $S_B$.

In step S15, the expansion suppressing jig 64 is displaced in a direction in which the separation distance in the arrangement direction Z expands. As a result, the suppressing force of the elastic deformation of the restraint mechanism 20 created by the expansion suppressing jig 64 is eliminated. In addition, due to the restraining pressure confined in the restraint mechanism 20, it is possible to apply a load to the plurality of unit cells 10 in the direction of compressing along the arrangement direction Z, and it is possible to restrain the plurality of unit cells 10. Thus, the cell pack 1 disclosed herein can be obtained.

As described above, in the present embodiment, the cell stack $S_B$ is compressed and inserted into the restraint mechanism 20 without elastically deforming the restraint mechanism 20 in the arrangement direction. It follows from the above that the cell pack can be produced by replacing a labor-intensive operation of deforming the restraint mechanism 20 having a high tensile strength by compression of the cell stack $S_B$ which can be compressed with a lower stress. Further, there is no need to provide jig holes 21a, 22a for inserting the mounting jigs 55u, 55d through the end plate portions 21, 22 of the restraint mechanism 20. As a result, it is possible to save the time and eliminate labor required for machining and realize the restraint mechanism 20 having a simple configuration. Furthermore, in the above-described configuration, the separation distance between the pair of end plate portions 21, 22 in the restraint mechanism 20 and the first dimension A1, which is the dimension of the compressed cell stack $S_B$ in the arrangement direction Z, need not to be made completely identical and there is a certain margin for error. For example, the separation distance of the end plate portions 21, 22 may be about ±3% to 5% (typically about 0% to −5%) with respect to the first dimension A1 which is the dimension of the compressed cell stack $S_B$ in the arrangement direction Z. Such an error can be suitably absorbed, for example, by providing a taper on the front side of the sliding plates 28, 29 in the insertion direction as described hereinabove.

Disassembling Method 2

Figure 12:
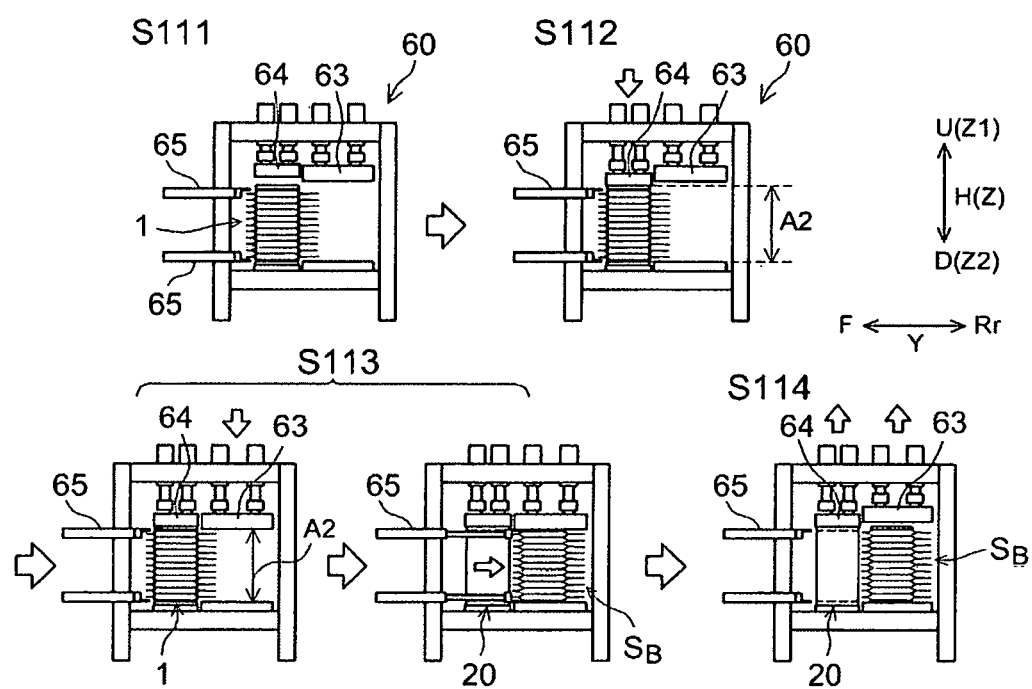
FIG. 12 is a process diagram illustrating a method for disassembling the cell pack according to another embodiment.

The above-described cell pack assembling device 60 can also be suitably used when disassembling the cell pack 1, for example, by following the disassembling steps S111 to S114, as shown in FIG. 12. The slider mechanism 65 of the cell pack assembling device 60 may be moved in advance from the side wall on the rear side Rr of the housing to the side wall on the front side F.

First, in the disassembling step S111, the cell pack 1 is set in the cell pack assembling device 60. Specifically, the cell pack 1 is placed in the assembly area on the front side F. At this time, the cell pack 1 is disposed so that the arrangement direction Z of the unit cells 10 coincides with the height direction H of the cell pack assembling device 60.

Next, in the disassembling step S112, the cell pack 1 is pressurized in the direction of compressing along the arrangement direction Z. Specifically, the expansion suppressing jig 64 of the cell pack assembling device 60 is displaced in a direction of compressing the restraining hoop portion 24 of the cell pack 1 in the arrangement direction Z. As a result, the separation distance between the end plate portions 21, 22 is reduced in the arrangement direction Z, and the dimension of the cell stack $S_B$ in the arrangement direction Z is also reduced. At this time, the expansion suppressing jig 64 may be displaced so that the separation distance between the end plate portions 21, 22, that is, the dimension of the compressed cell stack $S_B$ in the arrangement direction Z, becomes the second dimension A2.

In the disassembling step S113, the cell stack $S_B$ is taken out from between the displaced first end plate portion 21 and the second end plate portion 22. Specifically, first, the position of the compressing portion 63 in the height direction H is adjusted so that the distance between the lower surface of the compressing portion 63 and the upper surface of the base portion 61 of the compression area (which can be the upper surface of the spacer) becomes the second dimension A2. Then, the cell stack $S_B$ positioned between the end plate portions 21, 22 is pushed toward the rear side Rr by using the slider mechanism 65, thereby slidably moving the cell stack $S_B$ rearward Rr. The cell stack $S_B$ can thus be taken out from the restraint mechanism 20 of the cell pack 1 and moved to the space between the base portion 61 and the compressing portion 63 in the compression area. In the method for disassembling the cell pack disclosed herein, the compression area functions as a pressure release area. The sliding plates 28, 29 are disposed on the upper side U and lower side D of the cell stack $S_B$. As a result, the sliding of the cell stack $S_B$ can be implemented while suppressing the frictional force to a low level. Further, the distance between the lower surface of the compressing portion 63 and the upper surface of the base portion 61 is adjusted to be the second dimension A2. Thus, it is possible to take out the cell stack $S_B$ from the restraint mechanism 20 while preventing the slid cell stack $S_B$ from scattering to the periphery following the abrupt release of the restraining force. Further, since the end portions of the sliding plates 28, 29 in the longitudinal direction Y are tapered, the cell stack $S_B$ can be slid while suppressing the interference of the sliding plates 28, 29 with the compressing portion 63 and the base portion 61.

In the disassembling step S114, the compression of the restraining hoop portion 24 by the expansion suppressing jig 64 is released and the restraining pressure is released from the cell stack $S_B$. Specifically, the expansion suppressing jig 64 is displaced in the direction in which the distance between the end plate portions 21, 22 increases. This makes it possible to release the compressive stress applied to the restraining hoop portion 24 in the arrangement direction by the expansion suppressing jig 64. Further, the compressing portion 63 is displaced in the direction in which the distance from the base portion 61 increases. This makes it possible to release the restraining force applied to the cell stack $S_B$ taken out between the compressing portion 63 and the base portion 61. It is preferable that the displacement of the compressing portion 63 be performed slowly in order to suppress the scattering of the unit cells 10 due to the abrupt release of the restraining force from the cell stack $S_B$. As a result, it is possible to release the restraining pressure from the cell stack $S_B$ in which the restraining pressure is confined, and to disassemble the cell pack 1 safely.

In the method for producing and method for disassembling the cell pack 1, the first end plate portion 21, the second end plate portion 22, and the restraining hoop portion 24 are formed integrally. However, such a configuration of the cell pack 1 is not limiting. Thus, the production method and the disassembling method described above can be used even when, for example, the first end plate portion 21, the second end plate portion 22, and the restraining hoop portion 24 are formed as separate constituent elements. Further, in the above-described production method and disassembling method, the dimension of the first end plate portion 21 and the second end plate portion 22 of the cell pack 1 in the longitudinal direction is made to be the same as the dimension of the left and right side wall portions 24L, 24R of the restraining hoop portion 24. However, such a configuration of the cell pack 1 is not limiting. For example, the above-described production method and disassembling method can be also used when the dimension of the left and right side wall portions 24L, 24R of the restraining hoop portion 24 is less than the dimension of the end plate portions 21, 22 in the longitudinal direction, or when the restraint mechanism 20 is provided with two or more restraining hoop portions 24.

Application

In the cell pack 1 disclosed herein, a plurality of unit cells 10 is restrained by the ring-shaped restraining hoop portion 24 in a state where a restraining pressure is applied to the unit cells. With such a configuration of the restraining hoop portion 24, the cell pack 1 can be restrained with a high restraining pressure, for example, about 5 times to about 10 times that in the related art. Such a configuration can be particularly preferably used for applying a high restraining pressure to the cell pack 1 having restrained therein a plurality of all-solid state cells in which the internal stress is increased due to a high interfacial resistance. As a result, it is possible to provide a cell pack 1 composed of all-solid state cells in which, for example, the internal resistance is reduced with respect to that in the related art.

Further, since the unit cells 10 in such a cell pack 1 can be restrained with a high restraining pressure, the present disclosure can be particularly suitably used in the cell pack 1 for applications in which a large current is charged and discharged at a high rate. Furthermore, the present disclosure can be particularly suitably used in the cell pack 1 in which the unit cells 10 using the active material having a high volume expansion rate during charging and discharging need to be restrained with a high restraining force over a long period of time, in the cell pack 1 to be used in an environment where vibration or the like occurs, and the like. For this reason, examples of suitable applications of the cell pack 1 disclosed herein include driving power sources mounted on a vehicle such as a plug-in hybrid vehicle (PHV), a hybrid vehicle (HV), an electric vehicle (EV) and the like.

Although specific examples of the present disclosure have been described in detail above, they are merely illustrative and do not limit the scope of the claims. The techniques set forth in the claims include those in which the specific examples described hereinabove are variously modified and changed.

For example, the integrally formed restraint mechanism 20 and the sliding plates 28, 29 used in the second embodiment may be individually used in the Production Method 1 and the Disassembling Method 1 of the cell pack 1 in the first embodiment. Likewise, the restraint mechanism 20, which is used in the first embodiment and in which the end plate portions 21, 22 and the restraining hoop portion 24 are configured as separate members, may be used in the Production Method 2 and the Disassembling Method 2 of the cell pack 1 in the second embodiment.

What is claimed is:

1. A method for disassembling a cell pack comprising
a first cell stack in which a plurality of unit cells is arranged in an arrangement direction, and
a restraint mechanism for restraining the plurality of unit cells,
the restraint mechanism including
a first end plate portion disposed at an end portion in a first direction of the arrangement direction of the first cell stack;
a second end plate portion disposed at an end portion in a second direction of the arrangement direction of the first cell stack; and
a ring-shaped restraining hoop portion including a first support portion disposed on a surface of the first end plate portion in the first direction, a second support portion disposed on a surface of the second end plate portion in the second direction, and a pair of side wall portions continuously connecting the first support portion and the second support portion along the arrangement direction,
the method for disassembling including:
displacing the first end plate portion relative to the second end plate portion in the first direction so as to extend the restraining hoop portion along the arrangement direction;
taking out the first cell stack from between the first end plate portion and the second end plate portion; and
displacing the displaced first end plate portion relative to the second end plate portion in the second direction to release the extension of the restraining hoop portion.

2. A method for disassembling a cell pack comprising
a second cell stack in which a plurality of unit cells is arranged in an arrangement direction, a first sliding plate is disposed at an end portion in a first direction of the arrangement direction of the plurality of unit cells, and a second sliding plate is disposed at an end portion in a second direction of the arrangement direction of the plurality of unit cells; and
a restraint mechanism for restraining the second cell stack,
the restraint mechanism including
a first end plate portion disposed at the end portion in the first direction of the arrangement direction of the second cell stack;
a second end plate portion disposed at the end portion in the second direction of the arrangement direction of the second cell stack; and
a ring-shaped restraining hoop portion including a first support portion disposed on a surface of the first end plate portion in the first direction, a second support portion disposed on a surface of the second end plate portion in the second direction, and a pair of side wall portions continuously connecting the first support portion and the second support portion along the arrangement direction,
the method for disassembling including:
compressing the cell pack in the arrangement direction so that the dimension of the second cell stack in the arrangement direction becomes a second dimension;
providing a pressure release area with a dimension in the arrangement direction equal to the second dimension at a position adjacent to the compressed second cell stack in a direction perpendicular to the arrangement direction of the compressed cell pack;
pressing the first sliding plate and the second sliding plate of the compressed second cell stack in a direction perpendicular to the arrangement direction toward the pressure release area, and moving the second cell stack from a space between the first end plate portion and the second end plate portion to the pressure release area; and
releasing the compression of the compressed second cell stack by enlarging the dimension of the pressure release area in the arrangement direction with respect to the second dimension.

* * * * *